(12) United States Patent
Youn et al.

(10) Patent No.: US 11,457,775 B2
(45) Date of Patent: Oct. 4, 2022

(54) METHOD OF CONTROLLING DRYER AND DRYER STAND

(71) Applicant: LG ELECTRONICS INC., Seoul (KR)

(72) Inventors: Jekwang Youn, Seoul (KR); Youngdon Kim, Seoul (KR); Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 484 days.

(21) Appl. No.: 16/576,255

(22) Filed: Sep. 19, 2019

(65) Prior Publication Data
US 2020/0085251 A1  Mar. 19, 2020

Related U.S. Application Data

(60) Provisional application No. 62/733,478, filed on Sep. 19, 2018.

(30) Foreign Application Priority Data

Jun. 13, 2019  (KR) .................. 10-2019-0070280

(51) Int. Cl.
*A47K 10/48*   (2006.01)
*A45D 20/12*   (2006.01)
(Continued)

(52) U.S. Cl.
CPC ............. *A47K 10/48* (2013.01); *A45D 20/12* (2013.01); *G01N 27/605* (2013.01); *G05D 27/02* (2013.01); *A45D 2020/128* (2013.01)

(58) Field of Classification Search
CPC ........ A47K 10/48; G05D 27/02; A45D 20/12; A45D 2020/126; A45D 2020/128; G01N 27/605
(Continued)

(56) References Cited

U.S. PATENT DOCUMENTS 1,514,495 A * 11/1924 Wirth ............... A45D 20/02
15/409
1,579,513 A * 4/1926 Cameron ............. A61N 5/06
392/419

(Continued)

FOREIGN PATENT DOCUMENTS

CN   105831950 A   8/2016
EP    0828383 A2 * 9/1997
(Continued)

*Primary Examiner* — Edelmira Bosques
*Assistant Examiner* — Bao D Nguyen
(74) *Attorney, Agent, or Firm* — Birch, Stewart, Kolasch & Birch, LLP

(57) ABSTRACT

A method of controlling a dryer stand, which includes a receptacle on which a dryer for discharging drying air is mounted and which is rotatable in a horizontal direction, and an air purification unit, are provided. The method includes detecting the dryer mounted on the receptacle, charging a battery provided in the dryer when the dryer mounted on the receptacle is detected, determining whether a predetermined condition for air purification operation is satisfied, and operating the air purification unit when it is determined that the predetermined condition for air purification operation is satisfied, whereby it is possible to purify indoor air. A method of controlling the dryer while it is not on the stand is also provided.

9 Claims, 21 Drawing Sheets

(51) Int. Cl.
    *G01N 27/60*     (2006.01)
    *G05D 27/02*     (2006.01)

(58) Field of Classification Search
    USPC .................................. 34/96, 283; 219/222
    See application file for complete search history.

(56) References Cited

U.S. PATENT DOCUMENTS

| | | | | |
|---|---|---|---|---|
| 1,660,802 | A * | 2/1928 | Martin | A45D 20/14 |
| | | | | 392/407 |
| 1,976,509 | A * | 10/1934 | Olsen | A45D 20/22 |
| | | | | 34/100 |
| 2,048,143 | A * | 7/1936 | Seidman | A45D 20/44 |
| | | | | 34/82 |
| 2,201,506 | A * | 5/1940 | Smith | A45D 20/10 |
| | | | | 392/383 |
| 2,479,387 | A * | 8/1949 | Matthews | A45D 20/44 |
| | | | | 34/562 |
| 2,527,745 | A * | 10/1950 | Lawrence | A45D 20/46 |
| | | | | 34/100 |
| 2,619,735 | A * | 12/1952 | Jacobowitz | A45D 20/22 |
| | | | | 34/100 |
| 2,856,700 | A * | 10/1958 | Wales | D06F 58/16 |
| | | | | 34/91 |
| 3,184,195 | A * | 5/1965 | Wahl | A45D 20/12 |
| | | | | 248/346.06 |
| 3,224,454 | A * | 12/1965 | Quinio | A45D 20/50 |
| | | | | 132/118 |
| 3,939,850 | A * | 2/1976 | Wahl | A45D 20/50 |
| | | | | 132/148 |
| 4,131,121 | A * | 12/1978 | Araki | A45D 20/22 |
| | | | | 132/211 |
| 4,219,178 | A * | 8/1980 | Assion | A45D 20/12 |
| | | | | 248/314 |
| 4,258,731 | A * | 3/1981 | Tsujimoto | A45D 20/20 |
| | | | | 132/212 |
| 4,278,223 | A * | 7/1981 | Fauteux | A45D 44/02 |
| | | | | 219/242 |
| 4,453,695 | A * | 6/1984 | Sennott | F16M 11/2064 |
| | | | | 248/278.1 |
| 4,461,439 | A * | 7/1984 | Rose | A45D 20/16 |
| | | | | 248/51 |
| 4,696,447 | A * | 9/1987 | Strecker | F16M 13/022 |
| | | | | 248/314 |
| 4,712,313 | A * | 12/1987 | Gettleman | A45D 20/16 |
| | | | | 248/314 |
| 4,757,183 | A * | 7/1988 | Karey | A45D 20/10 |
| | | | | 34/523 |
| 5,172,880 | A * | 12/1992 | McDougall | A45D 20/12 |
| | | | | 248/185.1 |
| 5,174,531 | A * | 12/1992 | Perakis | F16M 11/28 |
| | | | | D28/17 |
| 5,357,187 | A * | 10/1994 | Park | H02J 7/0024 |
| | | | | 320/160 |
| 5,357,203 | A * | 10/1994 | Landau | G01R 31/374 |
| | | | | 324/435 |
| 5,394,620 | A * | 3/1995 | Chimera | A45D 20/10 |
| | | | | 34/97 |
| 5,410,238 | A * | 4/1995 | Ishizuka | H02J 7/0091 |
| | | | | 320/160 |
| 5,613,305 | A * | 3/1997 | Narrin | A45D 20/12 |
| | | | | 34/91 |
| 5,636,815 | A * | 6/1997 | Wilson | F16M 11/28 |
| | | | | 248/219.2 |
| 5,721,987 | A * | 2/1998 | Ozawa | G03B 7/26 |
| | | | | 396/302 |
| 5,737,847 | A * | 4/1998 | Britton | F16C 11/0671 |
| | | | | 34/97 |
| 5,739,596 | A * | 4/1998 | Takizawa | G06F 1/263 |
| | | | | 307/64 |
| 5,832,624 | A * | 11/1998 | Narrin | F16M 13/00 |
| | | | | 34/97 |
| 5,881,983 | A * | 3/1999 | Hofmann | A45D 20/12 |
| | | | | 248/176.1 |
| 5,970,622 | A * | 10/1999 | Bahman | F16M 11/28 |
| | | | | 34/97 |
| 6,204,636 | B1 * | 3/2001 | Kinoshita | H02J 7/042 |
| | | | | 903/917 |
| 6,205,679 | B1 * | 3/2001 | Rodway | F26B 21/001 |
| | | | | 34/90 |
| 6,293,030 | B1 * | 9/2001 | McCurtis | A45D 20/22 |
| | | | | 34/96 |
| 6,301,800 | B1 * | 10/2001 | Standley | A45D 20/08 |
| | | | | 34/418 |
| 6,390,424 | B1 * | 5/2002 | Kidushim | F16M 11/24 |
| | | | | 248/404 |
| 6,491,267 | B1 * | 12/2002 | Feldman | A45D 20/12 |
| | | | | 248/176.1 |
| 6,664,764 | B1 * | 12/2003 | Odaohhara | H02J 7/0047 |
| | | | | 324/426 |
| 6,842,581 | B2 * | 1/2005 | Schafer | A47K 10/48 |
| | | | | 392/382 |
| 7,814,677 | B2 * | 10/2010 | Brewer | A45D 20/12 |
| | | | | 392/382 |
| 8,942,550 | B1 * | 1/2015 | Carter | F16M 11/24 |
| | | | | 392/382 |
| 10,945,569 | B1 * | 3/2021 | Varghese | F24H 9/2071 |
| 11,234,565 | B2 * | 2/2022 | Yoo | H02J 9/005 |
| 2002/0006275 | A1 * | 1/2002 | Pollack | A47K 10/48 |
| | | | | 392/382 |
| 2002/0014018 | A1 * | 2/2002 | Sahm | A45D 20/42 |
| | | | | 34/96 |
| 2002/0108264 | A1 * | 8/2002 | Perez | A45D 20/12 |
| | | | | 34/96 |
| 2003/0192194 | A1 * | 10/2003 | Evanyk | A45D 20/30 |
| | | | | 34/96 |
| 2003/0222069 | A1 * | 12/2003 | Sena | A45D 20/12 |
| | | | | 219/222 |
| 2004/0128853 | A1 * | 7/2004 | Ura | A45D 19/16 |
| | | | | 34/96 |
| 2004/0168337 | A1 * | 9/2004 | Curtin | A45D 20/12 |
| | | | | 34/96 |
| 2004/0236969 | A1 * | 11/2004 | Lippert | G06F 1/30 |
| | | | | 713/300 |
| 2004/0263125 | A1 * | 12/2004 | Kanno | H02P 9/48 |
| | | | | 320/128 |
| 2006/0076464 | A1 * | 4/2006 | Van | F16M 11/18 |
| | | | | 248/122.1 |
| 2006/0112586 | A1 * | 6/2006 | Kim | A45D 20/10 |
| | | | | 34/96 |
| 2008/0016712 | A1 * | 1/2008 | Van | F16M 11/18 |
| | | | | 34/283 |
| 2010/0307019 | A1 * | 12/2010 | Park | A01K 13/001 |
| | | | | 34/90 |
| 2011/0079239 | A1 * | 4/2011 | Hall | A45D 20/12 |
| | | | | 132/271 |
| 2011/0089905 | A1 * | 4/2011 | Yano | B60L 3/0046 |
| | | | | 320/132 |
| 2011/0197466 | A1 * | 8/2011 | Shami | A61N 5/0617 |
| | | | | 34/283 |
| 2012/0288288 | A1 * | 11/2012 | Imaizumi | G03G 15/80 |
| | | | | 399/38 |
| 2014/0358347 | A1 * | 12/2014 | Endo | B60W 20/40 |
| | | | | 180/65.265 |
| 2015/0223582 | A1 * | 8/2015 | Pedroarena | A45D 1/04 |
| | | | | 34/97 |
| 2016/0316884 | A1 * | 11/2016 | Ben-Hur | A45D 20/16 |
| 2016/0353854 | A1 * | 12/2016 | Thomas | H02J 7/0044 |
| 2017/0000234 | A1 * | 1/2017 | Annunziata | A45D 20/12 |
| 2017/0142656 | A1 * | 5/2017 | Hong | H04W 52/0235 |
| 2018/0027940 | A1 * | 2/2018 | Goldman | A45D 20/10 |
| 2018/0266044 | A1 * | 9/2018 | Durham | D06F 59/04 |
| 2018/0295964 | A1 * | 10/2018 | Otero | A45D 20/10 |
| 2019/0142132 | A1 * | 5/2019 | Nelson | H02J 7/0014 |
| | | | | 34/96 |
| 2020/0008552 | A1 * | 1/2020 | Thein | A45D 20/10 |
| 2020/0085162 | A1 * | 3/2020 | Yoo | A45D 20/10 |
| 2020/0085250 | A1 * | 3/2020 | Youn | A45D 20/14 |

(56) References Cited

U.S. PATENT DOCUMENTS

| | | | |
|---|---|---|---|
| 2020/0085252 A1* | 3/2020 | Yoo | F04D 29/388 |
| 2020/0085253 A1* | 3/2020 | Yoo | F24H 9/1863 |
| 2020/0085254 A1* | 3/2020 | Yoo | A45D 20/12 |
| 2020/0085255 A1* | 3/2020 | Yoo | F16M 11/126 |
| 2020/0085256 A1* | 3/2020 | Yoo | A45D 20/30 |
| 2020/0085257 A1* | 3/2020 | Yoo | A47K 10/48 |
| 2020/0085258 A1* | 3/2020 | Yoo | A45D 20/12 |
| 2020/0085259 A1* | 3/2020 | Yoo | A47K 10/48 |
| 2020/0085260 A1* | 3/2020 | Yoo | A45D 20/14 |
| 2020/0085261 A1* | 3/2020 | Yoo | A45D 20/10 |
| 2020/0085262 A1* | 3/2020 | Youn | A45D 20/12 |
| 2021/0362341 A1* | 11/2021 | Cote | B25J 19/0045 |
| 2021/0389735 A1* | 12/2021 | Funk | A61B 5/4866 |

FOREIGN PATENT DOCUMENTS

| | | | | |
|---|---|---|---|---|
| GB | 889466 A * | 2/1960 | | |
| JP | 06225468 A * | 8/1994 | | |
| JP | 5144978 B2 * | 2/2013 | | |
| JP | 5563896 B2 * | 7/2014 | | B60H 1/00921 |
| KR | 20-0369612 Y1 | 11/2004 | | |
| KR | 20110004185 A * | 7/2009 | | |
| KR | 10-2015-0031643 A | 3/2015 | | |
| KR | 10-2018-0043526 A | 4/2018 | | |
| KR | 20210022532 A * | 6/2019 | | |
| WO | WO-2011058699 A1 * | 5/2011 | | B60K 6/28 |

* cited by examiner

METHOD OF CONTROLLING DRYER AND DRYER STAND

CROSS-REFERENCE TO RELATED APPLICATION

This application claims the priority benefit of U.S. Provisional Application No. 62/733,478, filed on Sep. 19, 2018, and Korean Patent Application No. 10-2019-0070280, filed on Jun. 13, 2019, the entire disclosures of all of which are hereby expressly incorporated by reference into the present application.

BACKGROUND OF THE DISCLOSURE

Field of the disclosure

The present disclosure relates to a method of controlling a dryer for discharging drying air and a dryer stand, and more particularly to a method of controlling a dryer to be operated so as to perform an operation of drying and of controlling a dryer stand to operate an air purification unit provided in the dryer stand so as to perform an operation of purifying indoor air.

Description of the Related Art

When a dryer is used to dry a human body, a user usually performs an operation of drying while holding and moving the dryer.

In order to resolve an inconvenience in which a user must perform an operation of drying while holding the dryer, a stand capable of allowing a dryer to be mounted thereon, which is disclosed in KR 2015-0031643A, has been proposed.

However, the conventional stand has a problem in that, when user intends to change a region to be dried, the user must directly change the orientation of the stand or the user must move such that drying air from the dryer is discharged toward a region to be dried.

In addition, when an intended drying target has the ability to move about, such as an infant or a companion animal, the conventional stand has a problem in that it is difficult to frequently change the direction in which drying air is discharged from the dryer so as to be directed toward the drying target.

In order to solve the above problems, US 2010-0307019 A1 discloses a construction in which a dryer mounted on a stand is tilted. However, because this stand does not provide a construction in which the dryer is rotatable in a horizontal direction, there is a problem whereby it is difficult to respond to a change in the position of the drying target.

Furthermore, because the dryer of this related art is integrally formed with the stand, it is difficult for a user to perform an operation of drying while directly carrying or holding the dryer.

In addition, because a conventional stand only has a function of allowing a dryer to be mounted thereon, but does not provide a function of purifying indoor air, which is increasingly desirable function for a user, a user must have a separate air purifier in addition to the stand.

SUMMARY OF THE DISCLOSURE

Therefore, the present disclosure has been made in view of the above problems, and it is a first object of the present disclosure to provide a method of controlling a dryer stand, which is capable of purifying indoor air in addition to being capable of having a dryer mounted thereon.

A second object of the present disclosure is to provide a method of controlling a dryer stand, which is capable of controlling the operation of a dryer to perform an operation of drying an object to be dried in addition to being capable of having the dryer mounted thereon.

A third object of the present disclosure is to provide a method of controlling a dryer stand, which is capable of changing the direction in which drying air is discharged depending on the position and size of an object to be dried.

A fourth object of the present disclosure is to provide a method of controlling a dryer, which is capable of controlling activation and deactivation of the function of the dryer depending on the remaining charge amount of a battery provided in the dryer.

The objects of the present disclosure are not limited to the above-mentioned objects. Other specific details of the present disclosure will be apparent from the following detailed description and the embodiments of the present disclosure.

In accordance with an aspect of the present disclosure, the above and other objects can be accomplished by the provision of a method of controlling a dryer stand, which includes a receptacle on which a dryer for discharging drying air is mounted and which is rotatable in a horizontal direction, and an air purification unit.

The method according to the present disclosure includes (a) detecting the dryer mounted on the receptacle, (b) charging a battery provided in the dryer when the dryer mounted on the receptacle is detected, and (c) determining whether a predetermined condition for air purification operation is satisfied.

The method includes (d) operating the air purification unit when it is determined that the predetermined condition for air purification operation is satisfied, whereby it is possible to purify indoor air.

The operation (c) may include measuring the quality of ambient air around the dryer stand and determining that the predetermined condition for air purification operation is satisfied when the measured quality of the ambient air is equal to or lower than a predetermined value.

The method according to the present disclosure may further include (e) determining whether a predetermined condition for performing an operation of drying is satisfied.

Here, the method may further include (f) operating the dryer to discharge drying air (hereinafter, referred to as a "drying operation") when it is determined that the predetermined condition for the drying operation is satisfied, whereby it is possible to perform an operation of drying an object to be dried.

The operation (e) may include measuring ambient humidity around the dryer stand and determining whether the predetermined condition for the drying operation is satisfied based on the measured humidity as one piece of information.

The operation (f) may include receiving a signal dictating to proceed to a rotational drying operation mode in which the receptacle is rotated in the horizontal direction during the drying operation (hereinafter, referred to as a "rotation signal"), detecting the position and size of an object to be dried when the rotation signal is received, and when the position and size of the object to be dried are detected within a predetermined detection range, repeatedly rotating the receptacle in the horizontal direction within a range corresponding to the detection range.

The operation (f) may further include, when the position and size of the object to be dried are not detected, repeatedly rotating the receptacle in the horizontal direction within a range corresponding to a predetermined maximum detection range.

In order to accomplish the above objects, a method of controlling a dryer according to the present disclosure includes (g) measuring a remaining charge amount of a battery provided in the dryer, (h) receiving a signal dictating to proceed to a hot air mode (hereinafter, referred to as a "hot air signal"), (i) when the hot air signal is received, determining whether the measured remaining charge amount of the battery is higher than a first reference value, (j) when the measured remaining charge amount of the battery is higher than the first reference value, operating the dryer to discharge the drying air, which is heated by a heating coil of the dryer, in a hot air mode, and (k) when the measured remaining charge amount of the battery is equal to or lower than the first reference value, operating the dryer to discharge the drying air, which is not heated by the heating coil of the dryer, in a general air mode.

The method of controlling a dryer according to the present disclosure may further include (l) receiving a signal dictating to proceed to an air diffusion mode (hereinafter, referred to as a "air diffusion signal"), (m) when the air diffusion signal is received, determining whether the measured remaining charge amount of the battery is higher than a second reference value, (n) when the measured remaining charge amount of the battery is higher than the second reference value, operating the dryer to discharge the drying air through an outlet, which is rotatably moved, and (o) when the measured remaining charge amount of the battery is equal to or lower than the second reference value, operating the dryer to discharge the drying air through the outlet, which is stationary, in a converging air mode.

The method of controlling a dryer according to the present disclosure may further include (p) receiving a signal dictating to proceed to a strong wind mode (hereinafter, referred to as a "strong wind signal"), (q) when the strong wind signal is received, determining whether the measured remaining charge amount of the battery is higher than a third reference value, (r) when the measured remaining charge amount of the battery is higher than the third reference value, operating the dryer to discharge drying air at a predetermined flow rate or higher in the strong wind mode, and (s) when the measured remaining charge amount of the battery is equal to or lower than the third reference value, operating the dryer to discharge the drying air at a flow rate lower than the predetermined level in a weak wind mode.

Means to solve the problems not mentioned above will be sufficiently derived from the following description of embodiments of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF EXEMPLARY EMBODIMENTS

Reference will now be made in detail to embodiments, examples of which are illustrated in the accompanying drawings. However, the present disclosure may be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is defined only by the categories of the claims. In certain embodiments, detailed descriptions of device constructions or processes well known in the art may be omitted in order to avoid obscuring appreciation of the disclosure by a person of ordinary skill in the art. Wherever possible, the same reference numbers will be used throughout the drawings to refer to the same or like parts.

Figure 1:
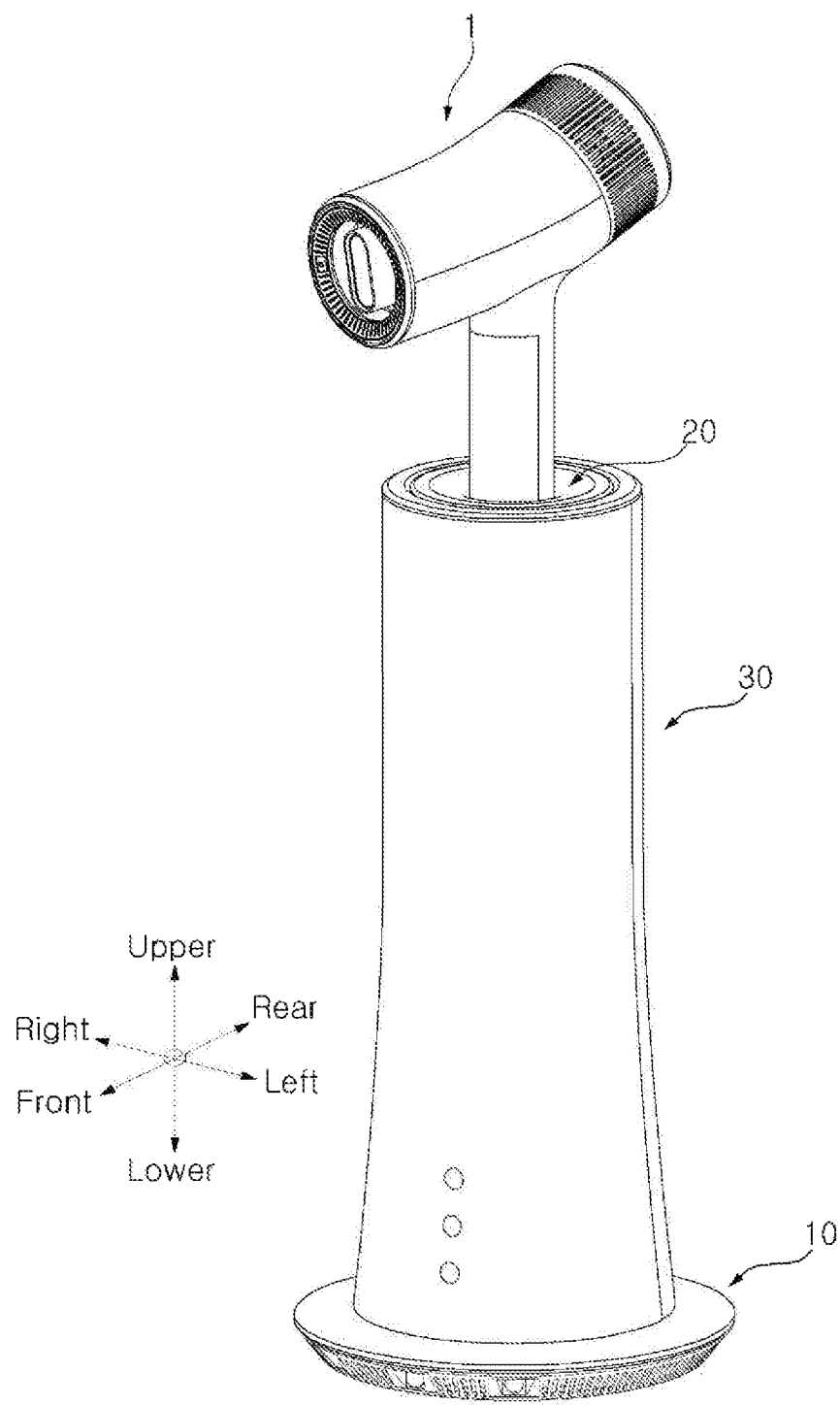
FIG. 1 is a perspective view illustrating the state in which the dryer according to an embodiment of the present disclosure is mounted on the dryer stand according to the embodiment of the present disclosure.

The present disclosure may be described based on the 3D coordinate system shown in FIG. 1, in which the directional terms "front", "rear", "upper", "lower", "left" and "right" are used.

Figure 5:
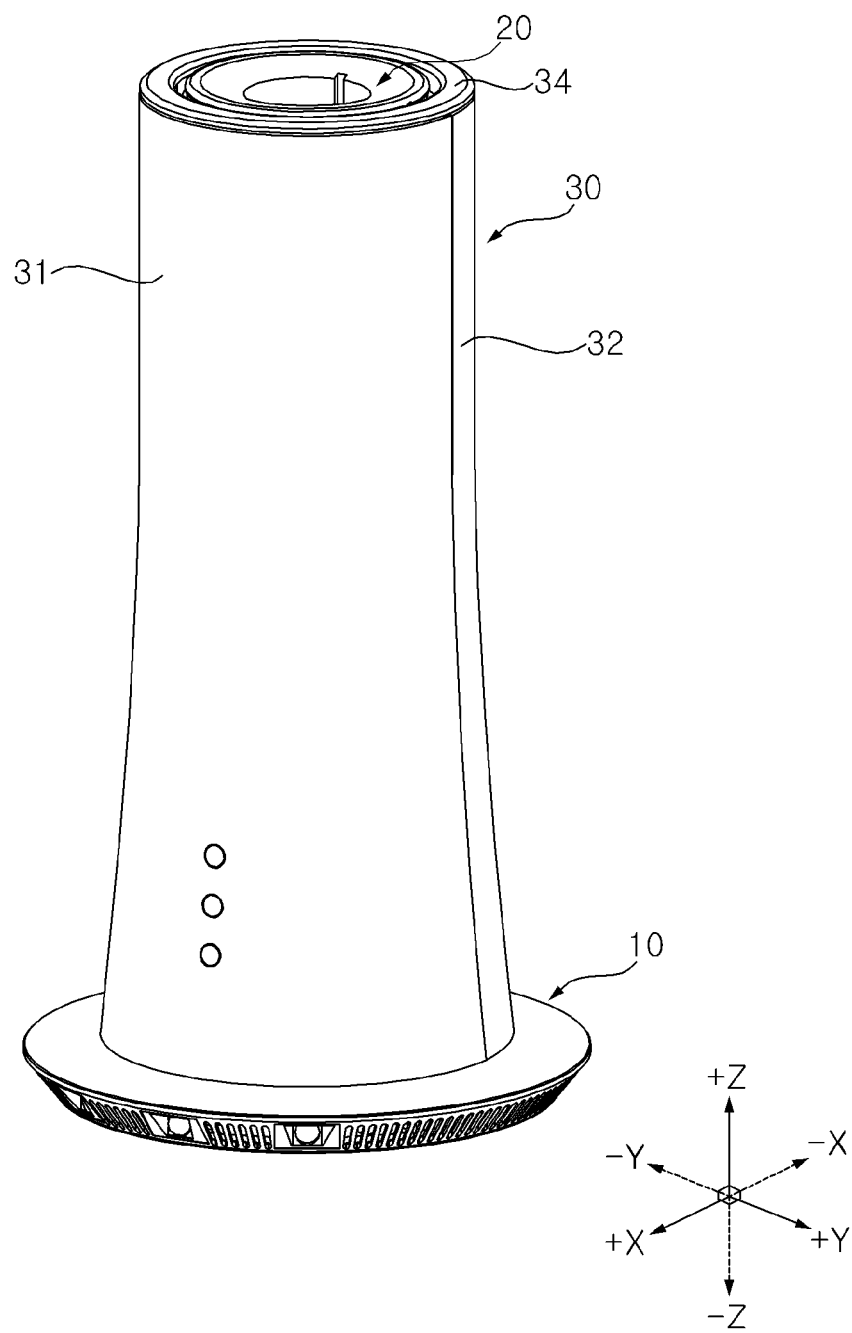
FIG. 5 is a perspective view illustrating the state in which the dryer according to the embodiment of the present disclosure is not mounted on the dryer stand according to the embodiment of the present disclosure.

The present disclosure may be described based on the spatial orthogonal coordinate system shown in FIG. 5 and the like, which is composed of an X-axis, a Y-axis and a Z-axis. In this specification, the X-axis, Y-axis and Z-axis may be defined taking the vertical direction as the Z-axis direction and the anteroposterior direction as the X-axis direction. Each of the X-axis direction, Y-axis direction and Z-axis direction means both directions in which each axis extends. Each axial direction, which is provided with a symbol "+" as a prefix (+X-axis direction, +Y-axis direction and +Z-axis direction), means one direction, that is, a positive direction in both directions in which the concerned axis extends. Furthermore, each axial direction, which is provided with a symbol "−" as a prefix (−X-axis direction, −Y-axis direction and −Z-axis direction), means one direction, that is, a negative direction in both directions in which the concerned axis extends.

Hereinafter, a dryer and a dryer stand according to an embodiment of the present disclosure will be described with reference to FIGS. 1 to 14.

Figure 2:
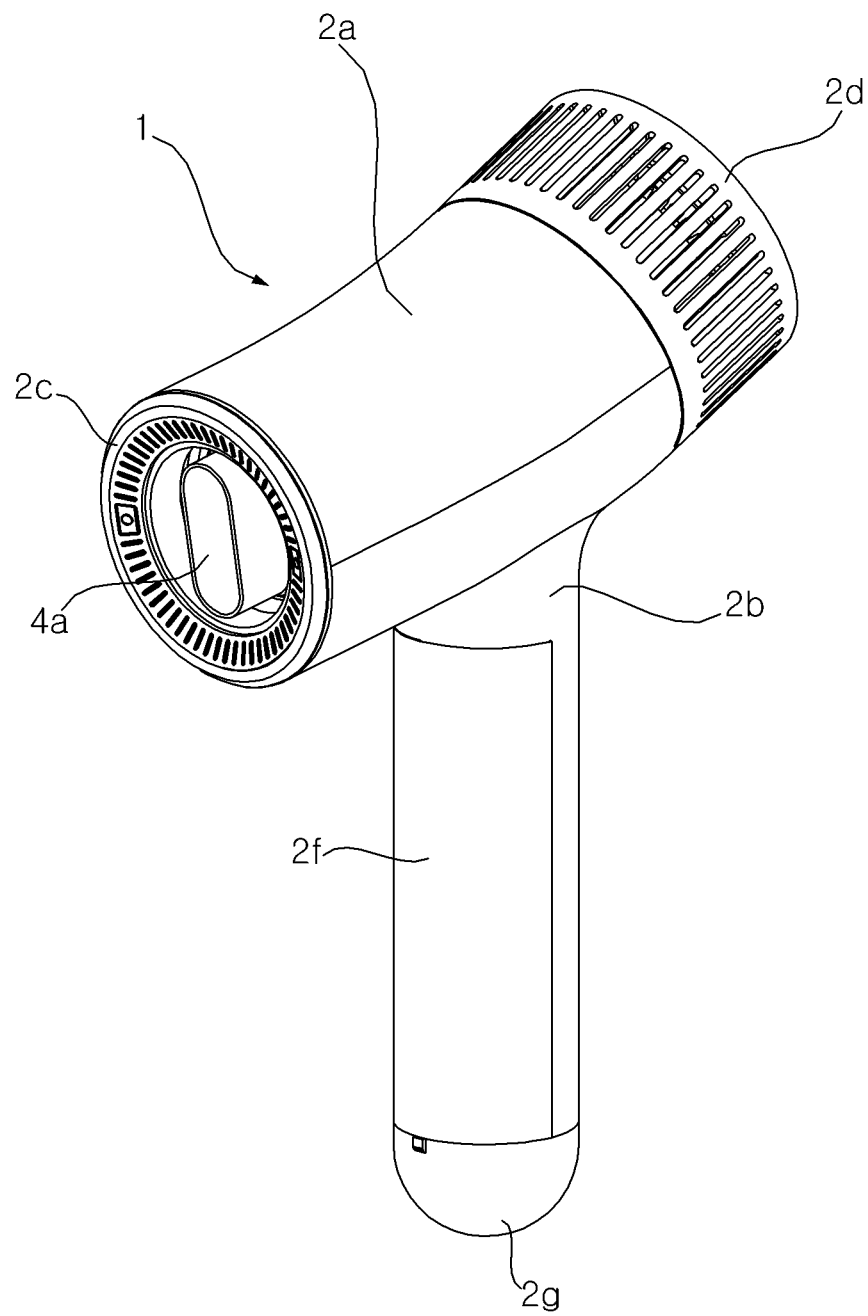
FIG. 2 is a perspective view of the dryer according to the embodiment of the present disclosure when viewed from the front thereof.
Figure 3:
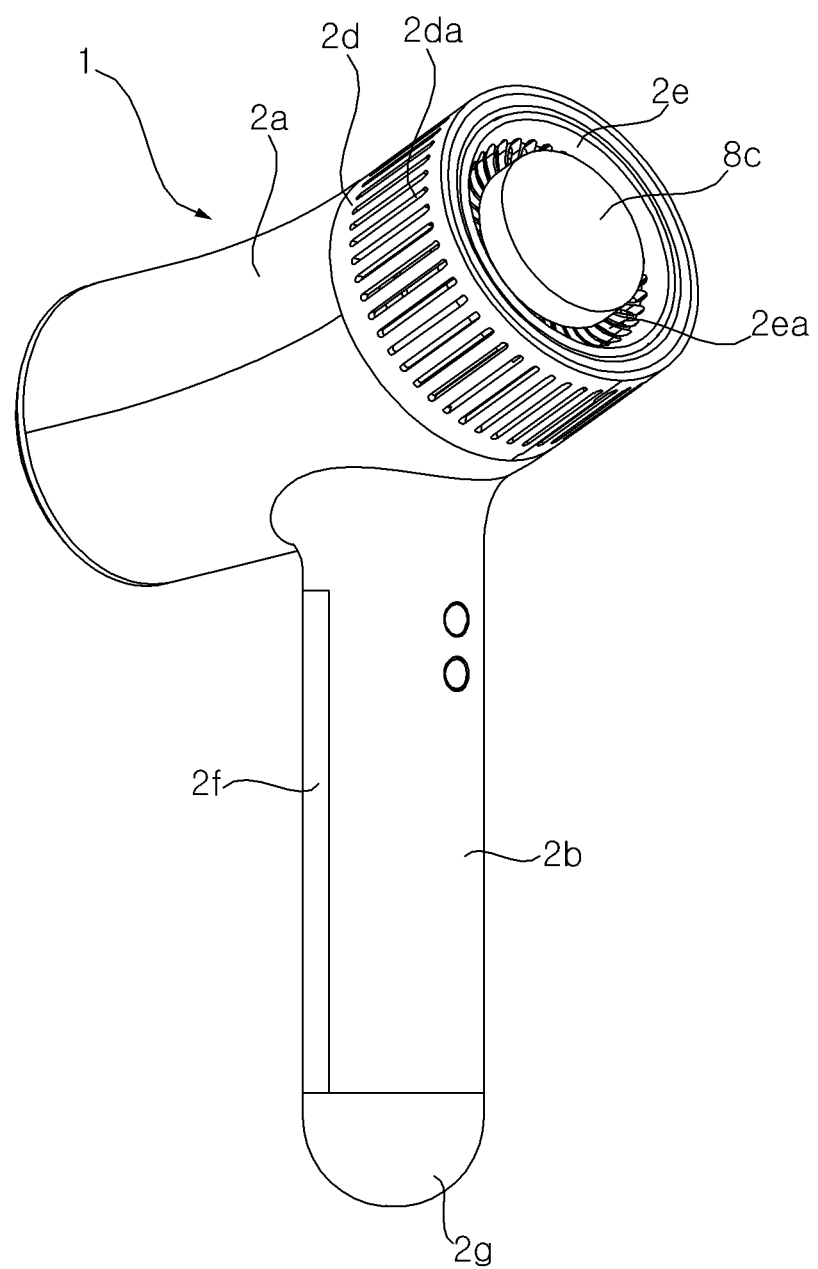
FIG. 3 is a perspective view of the dryer according to the embodiment of the present disclosure when viewed from rear thereof.
Figure 6:
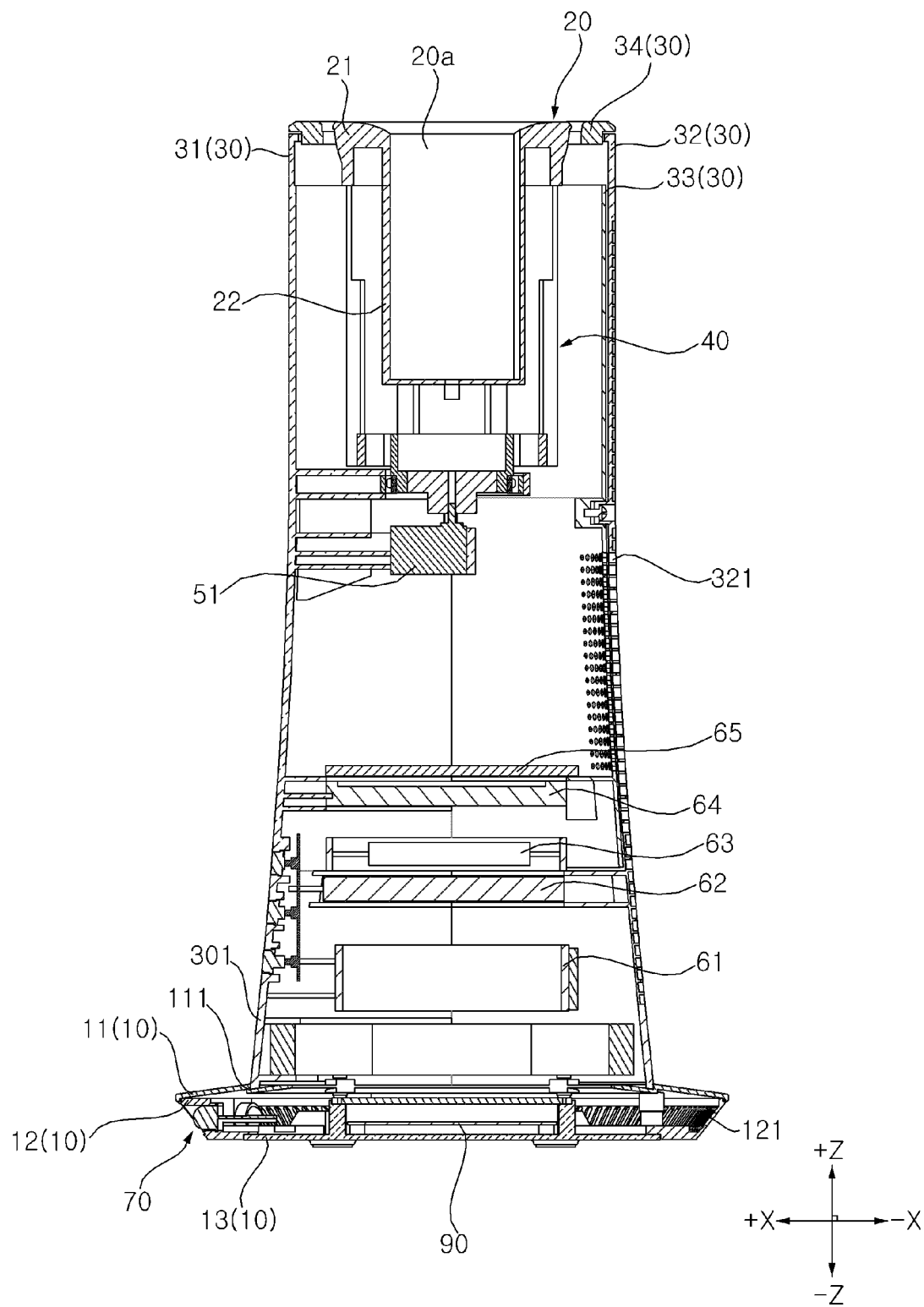
FIG. 6 is a longitudinal cross-sectional view of the dryer stand according to the embodiment of the present disclosure when viewed from left side thereof.
Figure 7:
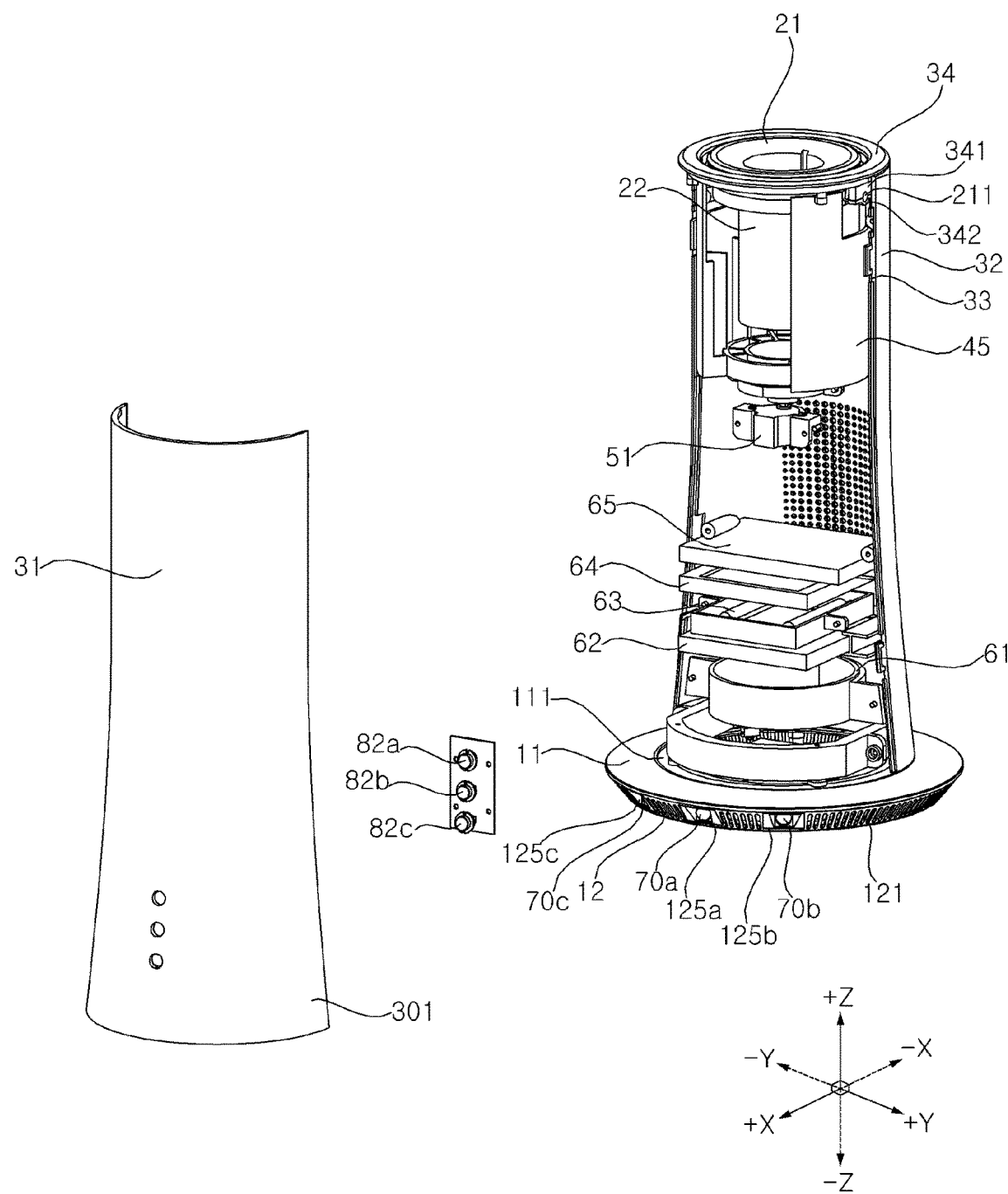
FIG. 7 is a front exploded perspective view of the dryer stand according to the embodiment of the present disclosure.
Figure 8:
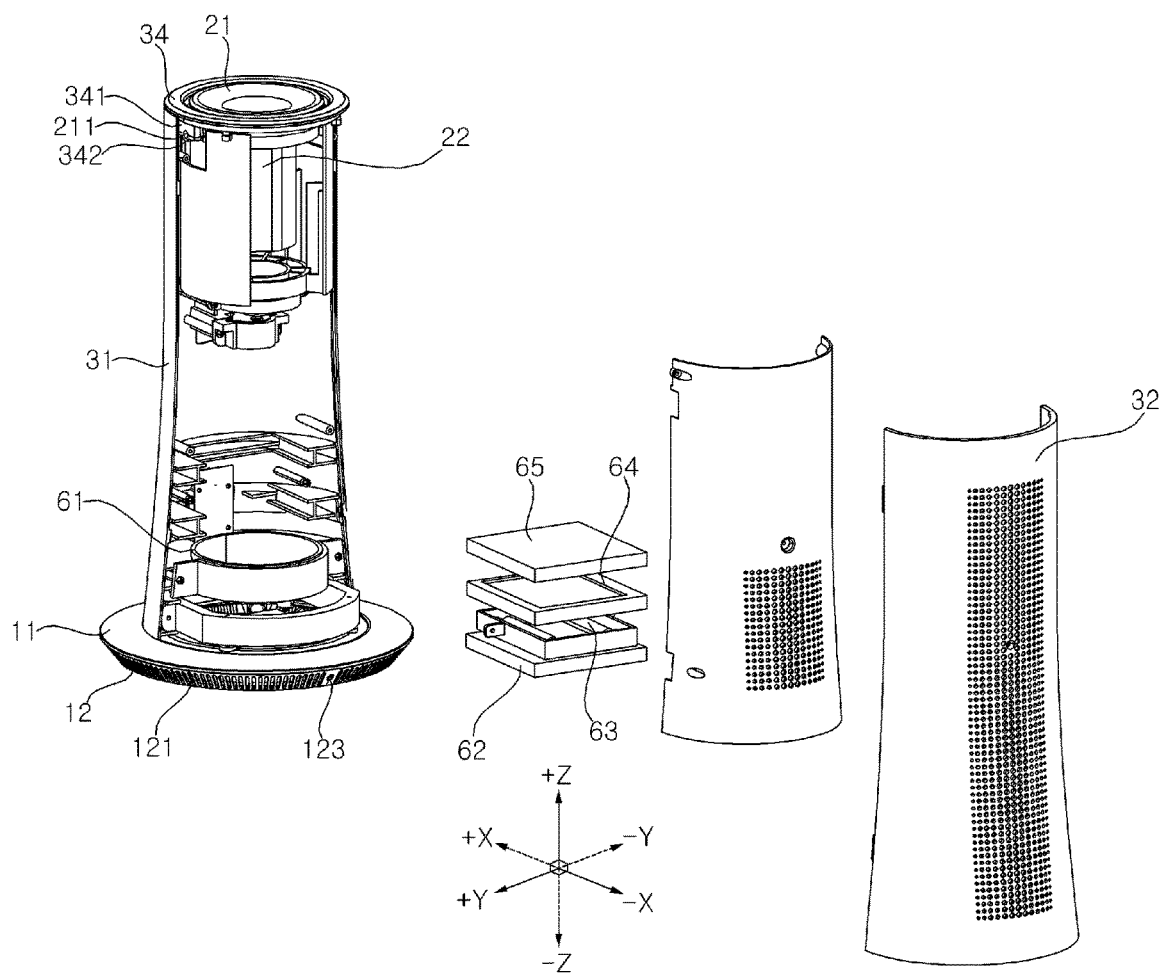
FIG. 8 is a rear exploded perspective view of the dryer stand according to the embodiment of the present disclosure.
Figure 9:
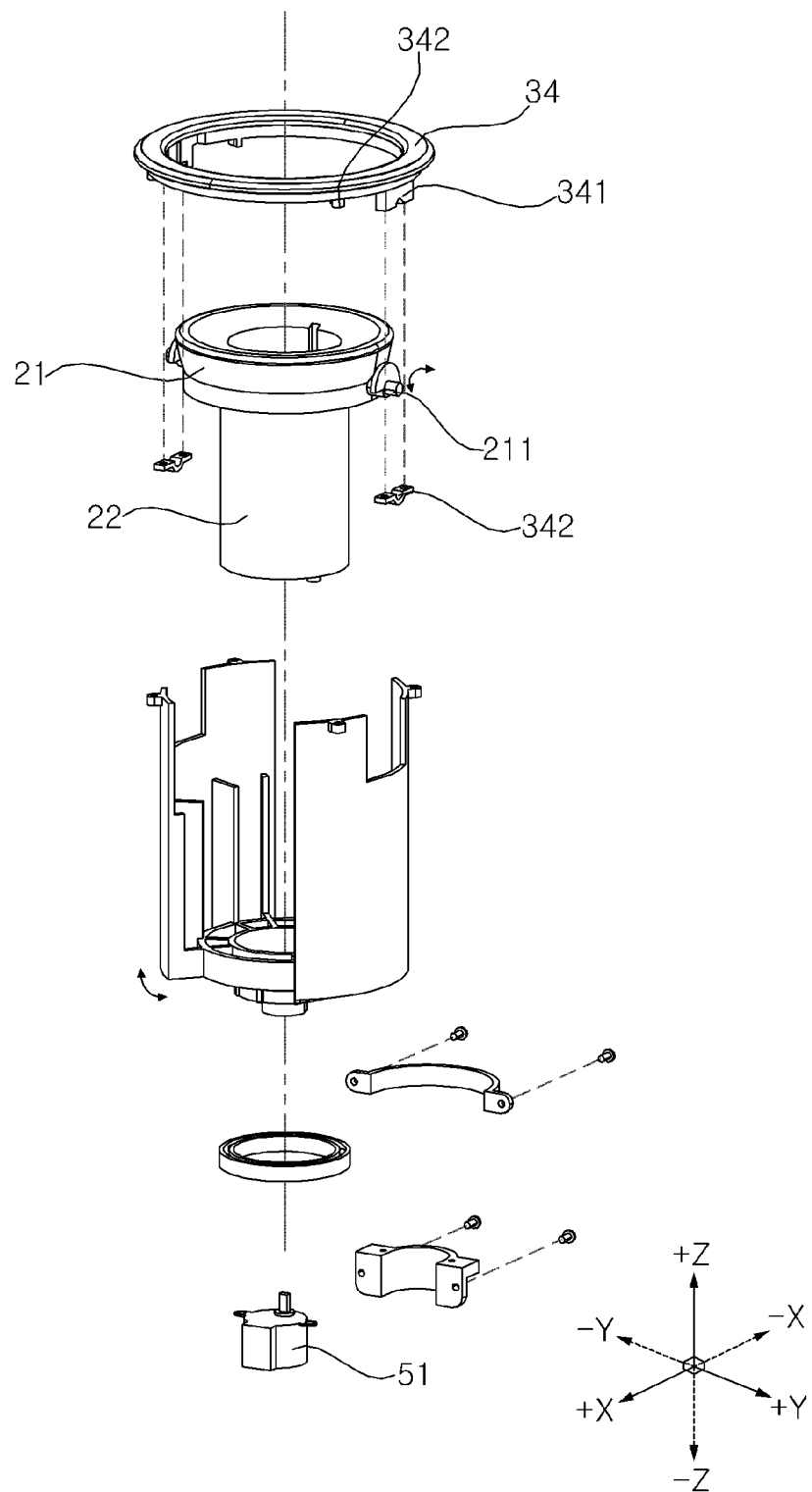
FIG. 9 is an exploded perspective view of the upper part of the dryer stand according to the embodiment of the present disclosure.
Figure 10:
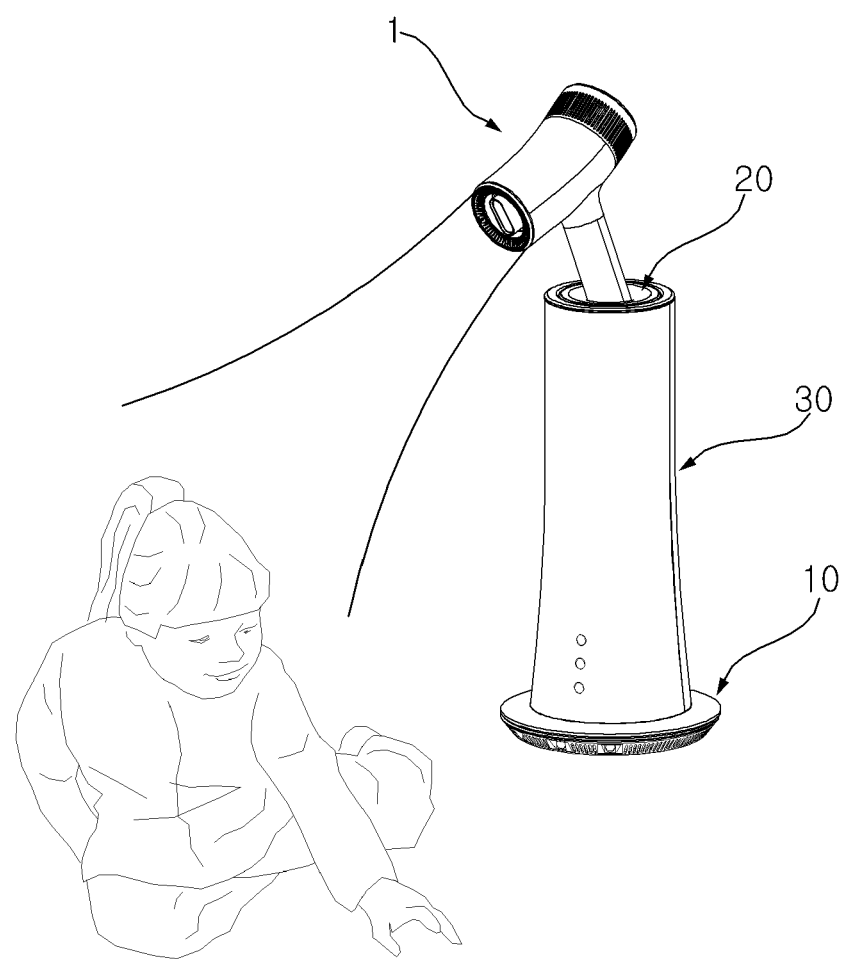
FIG. 10 is a view illustrating the operating state of the dryer stand according to the embodiment of the present disclosure.
Figure 11:
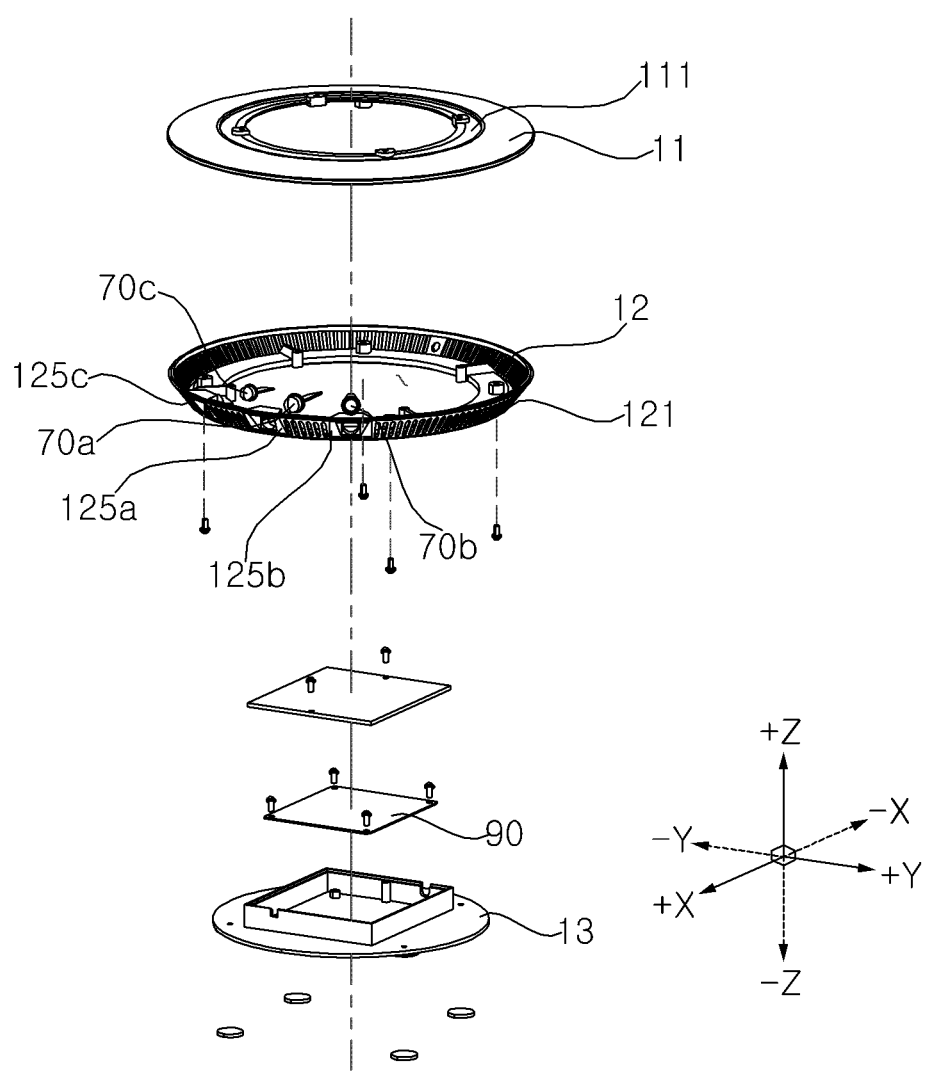
FIG. 11 is an exploded perspective view of a base of the dryer stand according to the embodiment of the present disclosure.
Figure 12:
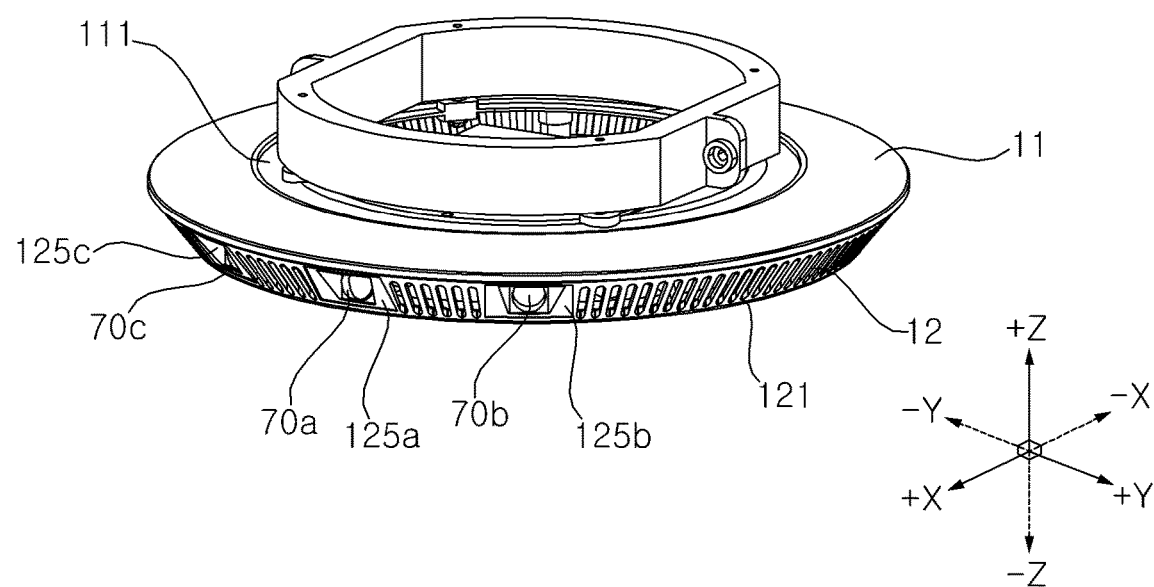
FIG. 12 is a perspective view of the base and a support of the dryer stand according to the embodiment of the present disclosure.
Figure 13:
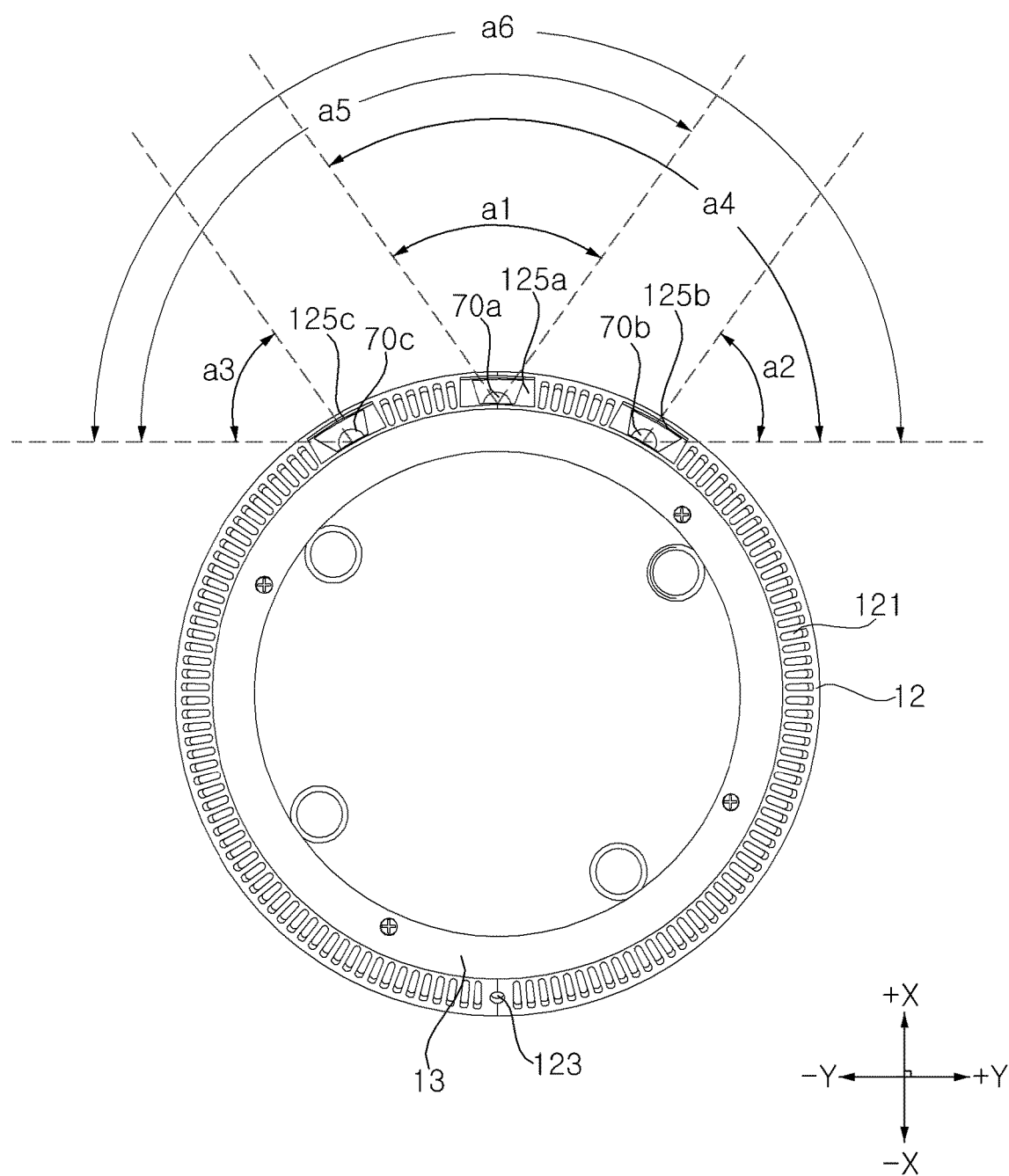
FIG. 13 is a view illustrating a detection range of a sensor of the dryer stand according to the embodiment of the present disclosure.
Figure 14:
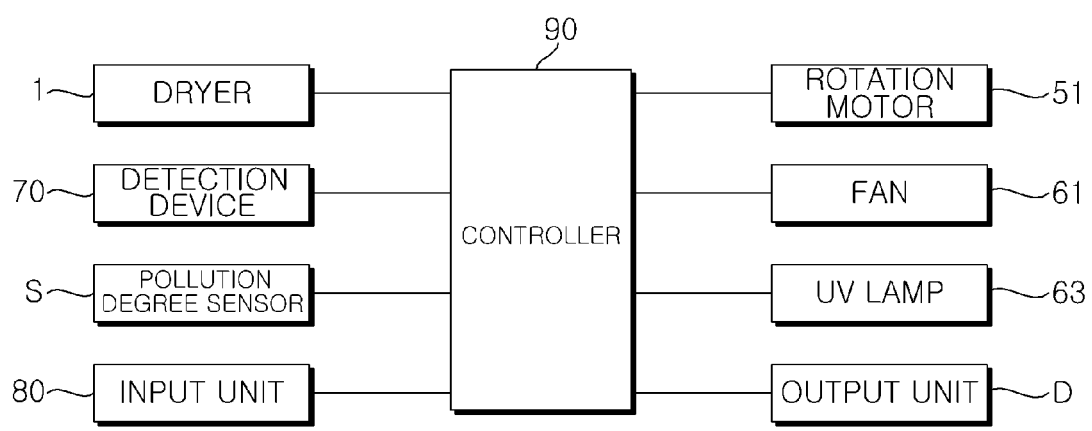
FIG. 14 is a control system diagram of the dryer stand according to the embodiment of the present disclosure.

FIG. 1 is a perspective view illustrating the state in which the dryer according to the embodiment of the present disclosure is mounted on the dryer stand according to the embodiment of the present disclosure. FIG. 2 is a perspective view of the dryer according to the embodiment of the present disclosure when viewed from the front thereof. FIG. 3 is a perspective view of the dryer according to the embodiment of the present disclosure when viewed from rear thereof. FIGS. 4A to 4E are exploded perspective views of the dryer according to the embodiment of the present disclosure. FIG. 5 is a perspective view illustrating the state in which the dryer according to the embodiment of the present disclosure is not mounted on the dryer stand according to the embodiment of the present disclosure. FIG. 6 is a longitudinal cross-sectional view of the dryer stand according to the embodiment of the present disclosure when viewed from left side thereof. FIG. 7 is a front exploded perspective view of the dryer stand according to the embodiment of the present disclosure. FIG. 8 is a rear exploded perspective view of the dryer stand according to the embodiment of the present disclosure. FIG. 9 is an exploded perspective view of the upper part of the dryer stand according to the embodiment of the present disclosure. FIG. 10 is a view illustrating the operating state of the dryer stand according to the embodiment of the present disclosure. FIG. 11 is an exploded perspective view of a base of the dryer stand according to the embodiment of the present disclosure. FIG. 12 is a perspective view of the base and a support of the dryer stand according to the embodiment of the present disclosure. FIG. 13 is a view illustrating the detection range of a sensor of the dryer stand according to the embodiment of the present disclosure. FIG. 14 is a control system diagram of the dryer stand according to the embodiment of the present disclosure.

Prior to a description of a method of controlling the dryer and the dryer stand according to the embodiment of present disclosure, the constructions and operating principles of the dryer and the dryer stand for realizing the method will first be described.

The dryer 1 is an apparatus, which is constructed so as to perform an operation of drying on an object to be dried, such as a human or a companion animal, using drying air, which is discharged through an outlet. As illustrated in FIG. 1, the dryer according to the embodiment of the present disclosure, which is intended to discharge drying air, may be mounted on a receptacle 20 of the dryer stand, which will be described below.

As illustrated in FIGS. 2 and 3, the dryer 1 may have an appearance defined by a case. Specifically, lower cases 2b, 2f and 2g may define a grip, which is held by a user. An upper case 2a may define a hollow portion in conjunction with the lower cases 2b, 2f and 2g so as to accommodate the internal components of the dryer 1, which will be described below.

A front case 2c may be provided with an opening such that a discharge tube 4a, through which drying air is discharged, is exposed to the outside of the dryer 1. A rear case 2e may be provided with a display unit (display) later and may be provided with introduction holes 2ea, through which air is introduced into the case. A cylindrical cap 2d may be interposed between the rear case 2e and the upper case 2a and may also be provided with introduction holes 2da, through which air is introduced into the case.

In the embodiment of the present disclosure, the case is described as being assembled in such a way that the upper case 2a, the lower cases 2b, 2f and 2g, the front case 2c, the rear case 2e and the cylindrical cap 2d are manufactured separately in advance and then coupled to each other. However, two or more components among the above components may be integrally manufactured, unlike the embodiment shown.

The terms "coupled", used herein, means that two components are integrally coupled or assembled through a known process such as fusion, bonding, interference fitting, threading, bolting or key-coupling.

Figure 4A:
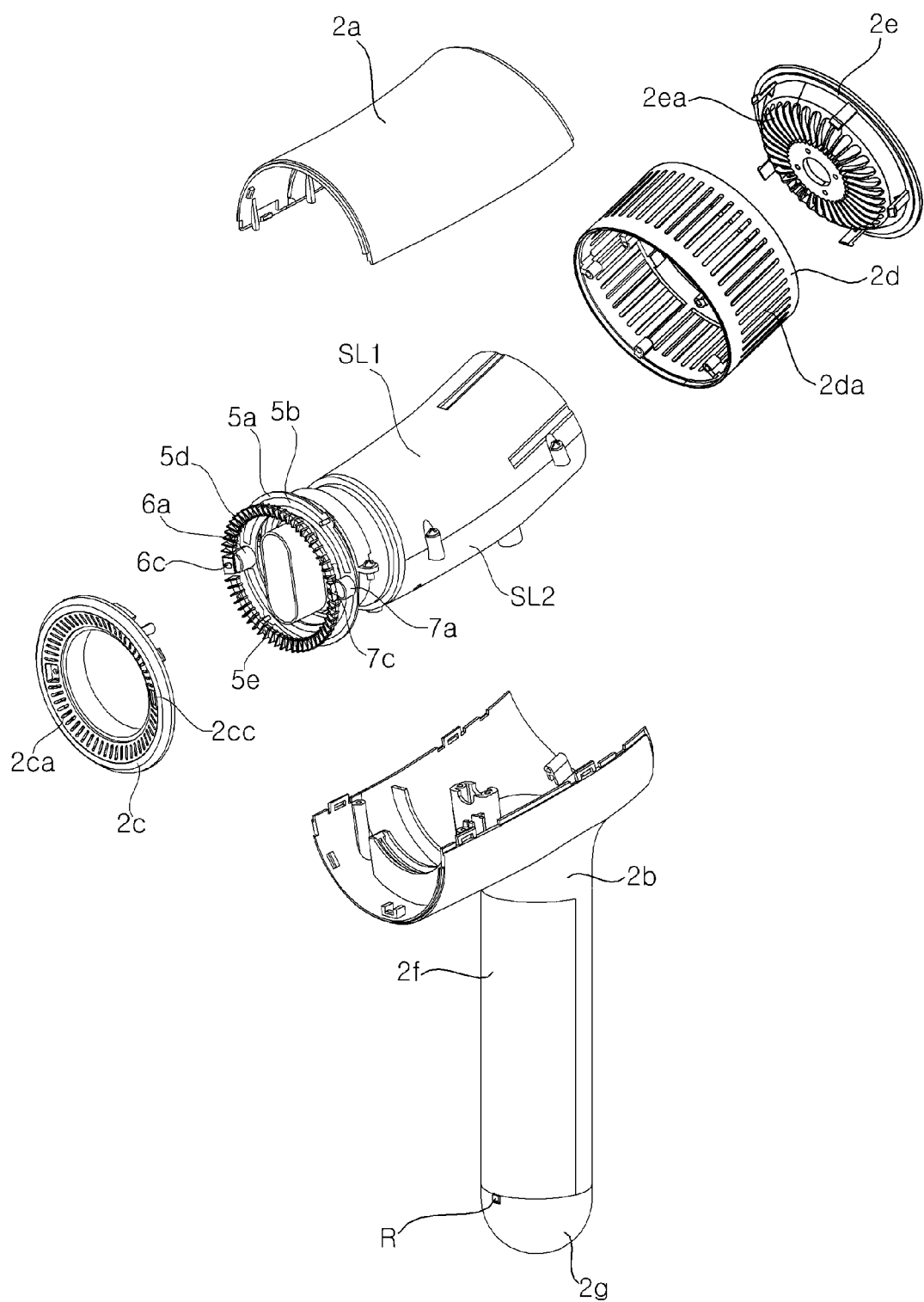
FIGS. 4A to 4E are exploded perspective views of the dryer according to the embodiment of the present disclosure.

As illustrated in FIG. 4A, the case may be provided therein with inner sleeves SL1 and SL2. The outer peripheral surface of the upper inner sleeve SL1 may be brought into close contact with the inner peripheral surface of the upper case 2a, and the outer peripheral surface of the lower inner sleeve SL2 may be brought into close contact with the inner peripheral surface of the lower case 2b.

Figure 4B:
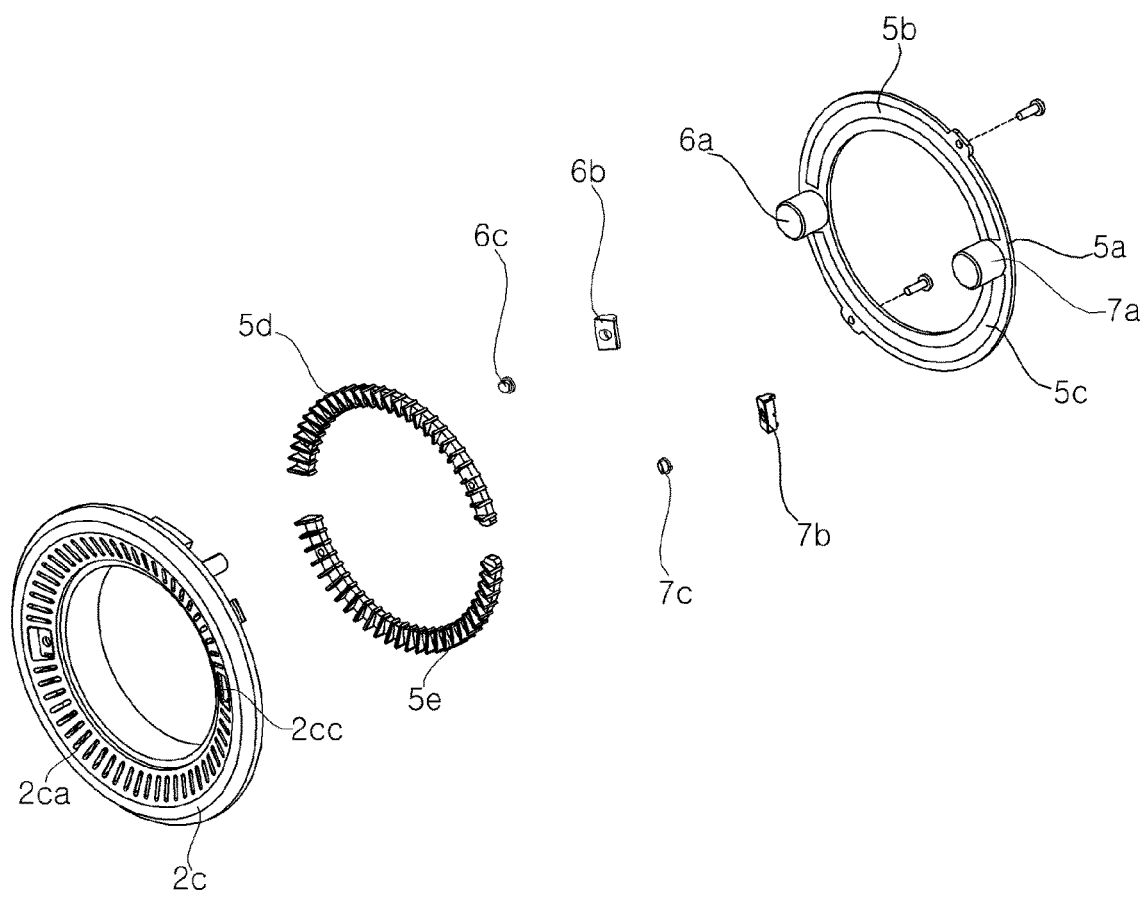

As illustrated in FIGS. 4A and 4B, a lighting unit, an ion-generating unit and a temperature-measuring unit may be disposed in front of the inner sleeves SL1 and SL2. The lighting unit, which is a unit for radiating light in the forward direction of the dryer 1, may include a holding ring 5a, light-emitting panels 5b and 5c and light-diffusing modules 5d and 5e.

The light-emitting panels 5b and 5c, which are coupled to the front portion of the holding ring 5a, may be LED panels at which at least one LED module (not shown) is disposed. The light-emitting panels 5b and 5c may be constructed such that two semicircular panel pieces are disposed so as to define a single ring-shaped panel. Here, a predetermined gap may be defined between the two panel pieces.

The light-diffusing modules 5d and 5e may be disposed in front of the light-emitting panels 5b and 5c and may be composed of light guide plates capable of diffusely radiating the light emitted from the light-emitting panels 5b and 5c. The light-diffusing modules 5d and 5e may be constructed such that two semicircular module pieces are disposed so as to define a single ring-shaped module as in the light-emitting panels 5b and 5c. Here, a predetermined gap may be defined between the two module pieces.

The front case 2c may be provided with light-guiding holes 2ca, into which the light-diffusing modules 5d and 5e are fitted. The light-guiding holes 2ca may guide the light that has passed through the light-diffusing modules 5d and 5e in a forward direction. Since the lighting unit, which is constructed in the above-mentioned manner, illuminates a region to be dried, it is easy to check the state of the skin and hair of an object to be dried.

The ion-generating unit, which is a device for discharging ions (such as negative ions) in the forward direction of the dryer 1, may include an ionizer 6a, that is, an ion generator, an ion discharge cover 6b and an ion discharge port 6c. The ionizer 6a may be disposed in the gap defined between the two panel pieces and in the gap defined between the two module pieces. The ionizer 6a may create + and − ions using corona discharge or plasma discharge.

The ion discharge cover 6b and the ion discharge port 6c fitted into the ion discharge cover 6b may be fitted into a hole formed in the front case 2c. Consequently, predetermined ions may be discharged through the ion discharge port 6c in a forward direction so as to eliminate harmful substances such as various bacteria contained in the air. Furthermore, it is possible to prevent foreign substances, such as dust floating in the air, from adhering to an object to be dried by neutralizing and agglomerating the dust. In addition, it is possible to assist in maintaining the moisturized state of skin and hair of an object to be dried.

The temperature-measuring unit, which is a device for detecting the body temperature of an object to be dried, may include a thermometer 7a, an infrared port cover 7b and an infrared port 7c. The thermometer 7a may be disposed in the gap defined between the two panel pieces and in the gap defined between the two module pieces. By way of example, the thermometer 7a may be a device for detecting the body temperature of an object to be dried using infrared radiation.

Here, the infrared port 7c, which is fitted into the infrared port cover 7b, may emit an infrared radiation toward the object to be dried and may receive the infrared radiation reflected by the object to be dried. The infrared port cover 7b and the infrared port 7c fitted into the infrared port cover 7b may be fitted into a hole 2cc formed in the front case 2c. Accordingly, it is possible to detect the body temperature of an object to be dried before a drying operation and to detect the temperature of the region to be dried in real time after the drying operation.

Figure 4C:
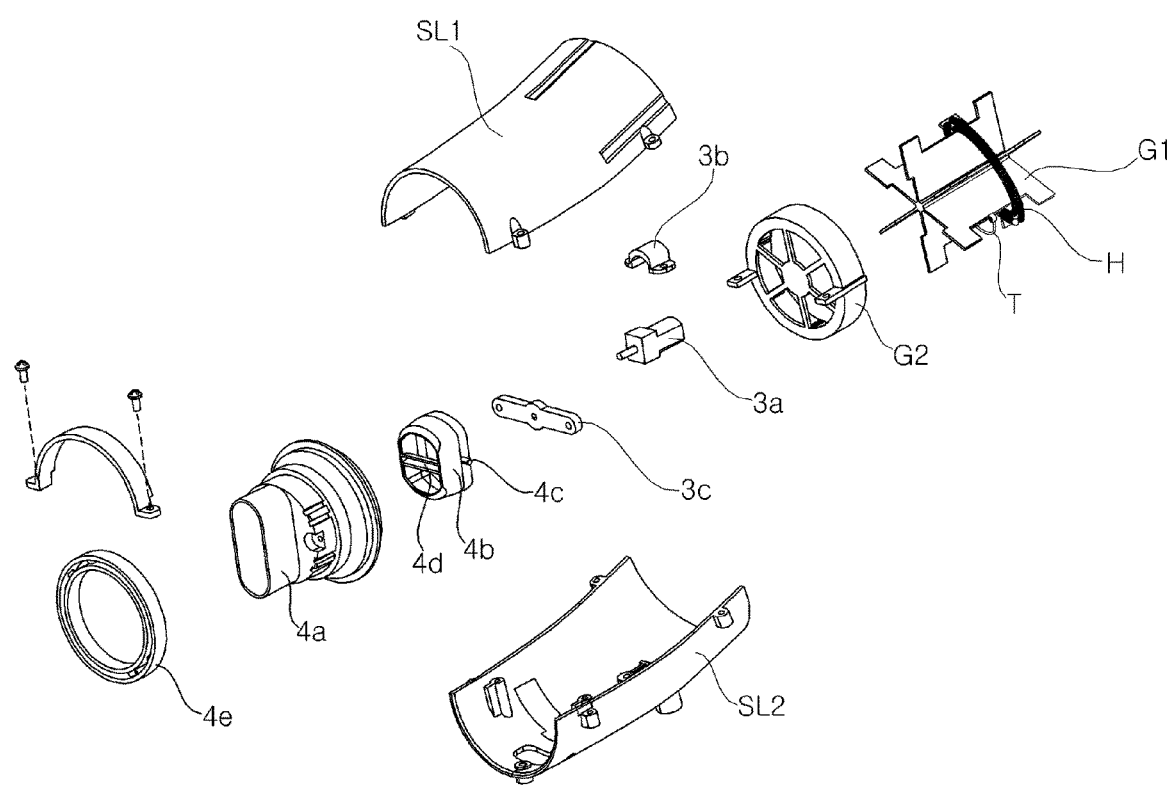
Figure 4D:
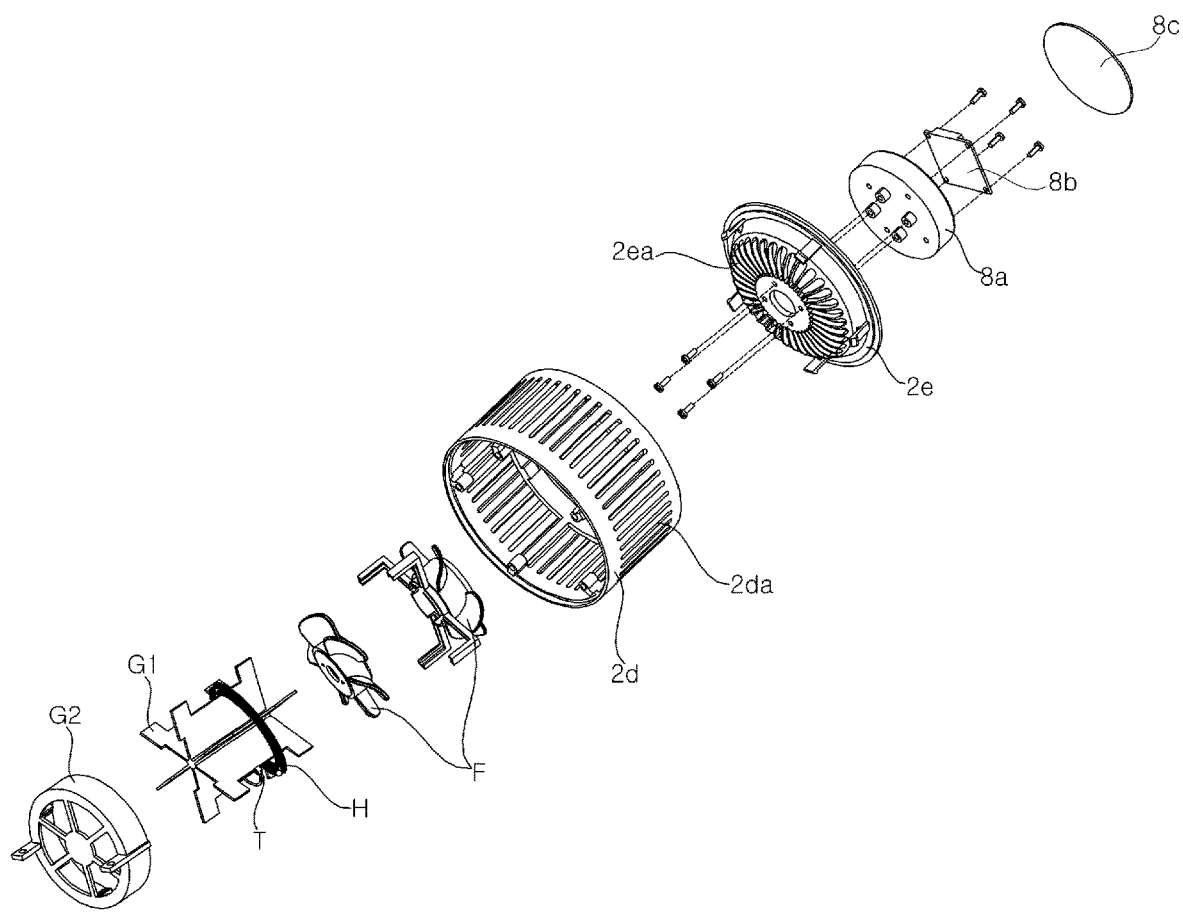

As illustrated in FIGS. 4A, 4C and 4D, at least a portion of a discharge unit, a motor 3a, air guides G1 and G2, a heating coil H (heater), a discharge temperature sensor T and a fan F may be disposed between the inner sleeves SL1 and SL2.

The fan F, which is a device for introducing air to into the case and to discharging the same to the outside, may be disposed inside the rear part of the case. Here, air may be introduced through introduction holes 2da formed in the cylindrical cap 2d and through introduction holes 2ea formed in the rear case 2e by means of the fan F.

By way of example, the fan F may include a first fan and a second fan disposed downstream of the first fan. Here, since the first and second fans may be designed so as to mainly serve as an air introduction fan and an air discharge fan, respectively, it is possible to reduce the amount of noise attributable to airflow while increasing the intake amount and the discharge amount of air. However, in some embodiments, the fan F may be constituted as a single fan.

The air guides G1 and G2 are disposed downstream of the fan F so as to guide the flow of air caused by the fan. By way of example, the air guides G1 and G2 may prevent airflow caused by the fan F from converging on one point.

The heating coil H and the discharge temperature sensor T may be disposed on the air guide G1 adjacent to the fan F, among the air guides G1 and G2. The heating coil H is a device for heating air, which flows by the fan F, and the discharge temperature sensor T is a device for measuring the temperature of air that has passed through the fan F and the heating coil H.

The motor 3a, which is a device for rotating the discharge unit, may be disposed downstream of the air guides G1 and G2. The motor 3a may be coupled to the lower sleeve SL2 via a motor mount 3b. Since a connector 3c, to which the rotating shaft of the motor 3a is coupled, is coupled to the discharge unit, the discharge unit may be rotated together with the motor 3a upon activation of the motor 3a.

The discharge unit may include the discharge tube 4a and a discharge guide 4b. The discharge tube 4a may be configured to have a funnel shape, which is small at the front side and is large at the rear side. The discharge tube 4a may be provided at the rear portion thereof with an air inlet and at the front portion thereof with an air outlet. The front part of the discharge tube 4a may be composed of a pipe portion having a predetermined shape, and the rear part of the discharge tube 4a may be composed of a cylindrical portion. A skirt part, which is decreased in cross-sectional area moving in a downstream direction, may be defined between the front part and the rear part.

A discharge guide 4b may be coupled to the discharge tube 4a in such a manner that coupling protrusions 4c formed on the outer peripheral surface of the discharge guide 4b are fitted into a coupling groove formed in the inner peripheral surface of the discharge tube 4a. Accordingly, when the discharge tube 4a, to which the connector 3c is coupled, is rotated by the rotation of the motor 3a, the discharge tube 4a may also be rotated therewith. The discharge guide 4b may be provided therein with a partition plate 4d so as to distribute the air passing through the discharge unit in a predetermined direction.

A bearing 4e may be coupled to at least a portion of the outer peripheral surface of the discharge unit so as to allow the discharge unit to rotate more smoothly.

As illustrated in FIG. 4D, the display unit may be coupled to the rear case 2e. The display unit may include a fixing base 8a, a display panel 8b and a display cover 8c.

Current operating information during a drying operation, for example, the discharge temperature of drying air, which is measured by the discharge temperature sensor T, the temperature of the region to be dried, which is measured by the temperature-measuring unit, the amount of drying air based on the rotational speed of the fan F, whether or not the discharge unit is rotating, the remaining charge amount of a battery B and the like may be displayed on the display unit.

Figure 4E:
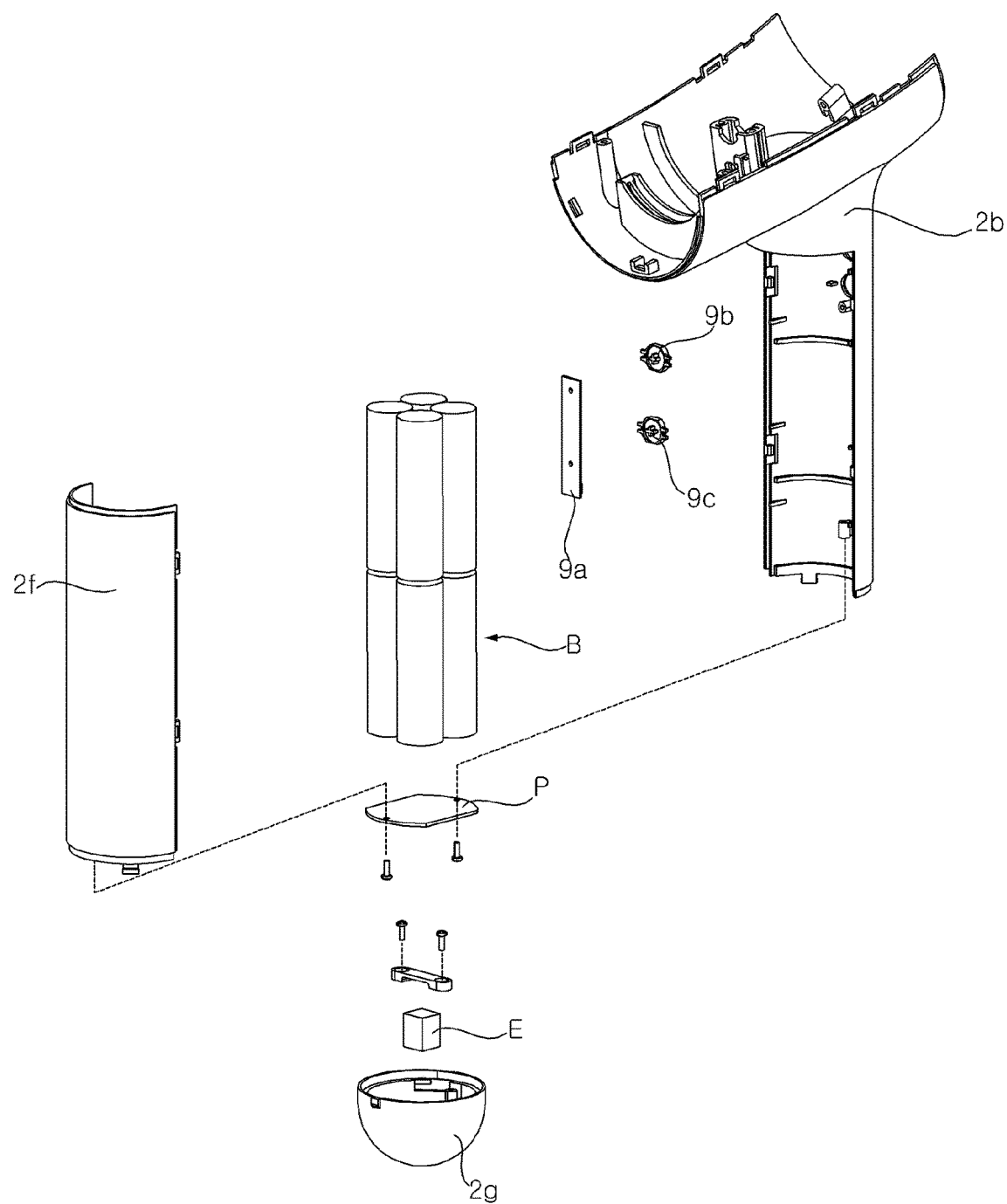

As illustrated in FIG. 4E, the lower cases 2b, 2f and 2g may be provided therein with the battery B, a printed circuit board (PCB) P, an electrode terminal E and a button unit.

The battery B, which is a rechargeable battery, may be charged by applying external power from the dryer stand to the battery B through the electrode terminal E. The battery B may apply power to components that require power among the components of the dryer 1.

The PCB P may be disposed under the battery B. A controller for controlling the operation of the internal components of the dryer 1 may be mounted on the PCB P.

The button unit may include a button housing 9a and first and second buttons 9b and 9c. By way of example, the first button 9b may control the amount of drying air and the on/off operation of the heating coil H, and the second button 9c may control the rotation of the discharge unit.

Since the dryer 1 for discharging drying air may be mounted on the dryer stand (hereinafter, simply referred to as a "stand") according to the embodiment of the present disclosure, as illustrated in FIG. 1, it is possible for a user to perform an operation of drying on an object without having to hold the dryer 1.

As illustrated in FIG. 5, the stand according to the embodiment of the present disclosure includes a base 10, which is positioned at the lower side thereof so as to serve as a support, a receptacle 20 and a stand body 30, which is disposed on the base 10 and which receives therein the receptacle 20 at a predetermined height from the base 10. As illustrated in FIGS. 1 and 5, the dryer 1 may be removably mounted on the receptacle 20.

As illustrated in FIG. 5, the stand body 30 may include an upper body 34 disposed adjacent to the upper portion of the receptacle 20 and side bodies 31 and 32 disposed between the upper body 34 and the base 10. The side bodies 31 and 32, which are bodies defining the side appearance of the stand, may include a front body 31 disposed at the front side thereof and a rear body 32 disposed at the rear side thereof.

As illustrated in FIGS. 7 and 8, the lower end portions 301 of the side bodies 31 and 32 may be fitted into a groove 111, which is formed in at least a portion of the upper end of the base 10. By way of example, the groove 111 may be configured to have a ring shape.

The body 30, particularly the side bodies 31 and 32, may receive therein the receptacle 20, and a rotation motor, a power transmission device, a fan, an air conditioning unit and the like, which are accommodated in the body 30, may be removably coupled to the body 30. In other words, the side bodies 31 and 32 may serve as supports or stems. However, in some embodiments, a stem may be provided separately from the body 30.

As illustrated in FIGS. 6 to 8, the stand according to the embodiment of the present disclosure may include an air purification unit (air purifier). The air purification unit may include a HEPA filter 62, an ultraviolet generator 63, a photocatalytic filter 64, a carbon filter 65 and a fan 61.

The air purification unit is an air filter capable of eliminating not only fine dust floating in the air but also microscopic particles such as powder, dead mites, pollen, cigarette smoke particles, airborne fungus and animal hair.

The ultraviolet generator 63 may be composed of an ultraviolet-light-emitting diode (UV LED) or an ultraviolet lamp (UV lamp). The ultraviolet generator 63 may radiate ultraviolet rays in order to kill airborne bacteria or microorganisms.

The photocatalytic filter 64 may decompose harmful substances by photochemical reaction in order to eliminate the odors of a companion animal or an elderly person (i.e., deodorizing). The photocatalytic filter 64 may be composed of a perforated adsorption substrate capable of adsorbing harmful substances in air, a photocatalyst attached to the perforated adsorption substrate and a promoter for assisting in the activation of the photocatalyst.

Here, the ultraviolet generator 63 may serve as a light source for causing activation of the photocatalyst provided on the photocatalytic filter 64. In some embodiments, a light-emitting module for causing activation of the photocatalyst may be additionally provided separately from the ultraviolet generator 63.

The carbon filter 65 is a filter capable of eliminating bad odors, harmful gas and the like contained in the air through chemical adsorption using activated carbon.

The HEPA filter 62, the ultraviolet generator 63, the photocatalytic filter 64 and the carbon filter 65 may be disposed in a flow path through which the air that has been introduced through an intake hole 121 is discharged to the discharge hole 321. Consequently, after various harmful substances, bad odors and the like contained in the air introduced into the body 30 are eliminated, the air may be discharged to the outside of the body 30. In other words, the stand according to the embodiment of the present disclosure is capable not only of allowing the dryer 1 to be mounted thereon but also of purifying indoor air.

As illustrated in FIGS. 6 to 9, the receptacle 20 may be constructed so as not only to allow the dryer 1 to be mounted thereon but also to allow at least one of an inclining action and a horizontally rotating action.

Accordingly, the anteroposterior change and the horizontal change of the direction in which air is discharged from the dryer 1 may be performed simultaneously or separately.

Here, the inclining action means rotation in an anteroposterior direction, that is, rotation about the Y-axis, which may be referred to as a "tilting action", and the horizontally rotating action means rotation about the Z-axis. However, the axis for the inclination action may be changed to another axis on the X-Y plane according to horizontal rotation of the receptacle 20.

As illustrated in FIGS. 6 to 9, the receptacle 20 may include a tub 21 and 22 defining a groove 20a into which at least a portion of the grip of the dryer 1 is inserted. The tub 21 and 22 may include an upper tub 21 and a lower tub 22.

As illustrated in FIGS. 7 to 9, the stand according to the embodiment of the present disclosure may include tilting pins 211 and pin mounts 341 and 342, which are provided to realize a tilting action of the receptacle 20. The tilting pins 211 may extend outwards from the outer surface of the receptacle 20 so as to serves as the axis of the tilting action of the receptacle 20. By way of example, the tilting pins 211 may be integrally formed with the outer surface of the upper tub 21.

Each of the pin mounts 341 and 342 may be coupled at one end thereof to the upper body 34 and may have therein a support hole, into which one of the tilting pins 211 is rotatably fitted.

The receptacle 20 according to the embodiment of the present disclosure may be rotated in the state in which the tilting pins 211 are fitted into the support holes formed in the pin mounts 341 and 342 (i.e., rotated about the Y-axis), thereby performing the tilting action. As a result, the direction in which air is discharged from the dryer 1 mounted on the receptacle 20 may be changed vertically, as illustrated in FIG. 10.

As illustrated in FIGS. 6 to 9, the stand according to the embodiment of the present disclosure may include a rotation motor 51 and a power transmission unit 40, which are components for realizing the horizontally rotating action of the receptacle 20.

Consequently, the receptacle 20 may be horizontally rotated by the forward and reverse rotation of the rotation motor 51. The power transmission unit 40 may transmit the power from the rotation motor 51 to the receptacle 20.

The rotation motor 51 may be a servomotor capable of controlling a rotational angle in a stepwise manner in response to a control signal. Accordingly, it is possible to control the rotational angle of the receptacle 20 in a horizontal direction in a stepwise manner.

Since the receptacle 20 is coupled to the upper body 34 via the tilting pins 211 and the pin mounts 341 and 342 and the power transmission unit 40 is coupled to the upper body 34, the receptacle 20 may be coupled to the power transmission unit 40 via the upper body 34. Here, the upper body 34 may be rotatably supported by the side bodies 31 and 32.

Accordingly, since the power from the rotation motor 51 may be transmitted to the receptacle 20 via the power transmission unit 40 and the upper body 34, the receptacle 20 may be horizontally rotated by forward and reverse rotation of the rotation motor 51. As a result, the direction in which air is discharged from the dryer 1 mounted on the receptacle 10 may be changed in a horizontal direction, as illustrated in FIG. 10.

As illustrated in FIG. 9, the power transmission unit 40 may be provided therein with a space corresponding to the orbit of the tilting action of the receptacle 20 and may be provided with spaces in which the tilting pins 211 and the pin mounts 341 and 342 are disposed.

Accordingly, the inclination action and the horizontally rotating action may be performed independently of each other. As a result, the vertical change and the horizontal change in the direction in which air is discharged from the dryer 1 mounted on the receptacle 20, may be performed at the same time or at different times.

As illustrated in FIGS. 11 to 13, the stand according to the embodiment of the present disclosure may include a detection device mounted on the base 10. The base 10 may include an upper base 11, an intermediate base 12 and a lower base 13.

The body 30 may be mounted on the upper base 11. As illustrated in FIGS. 6 to 8, the lower ends 301 of the side bodies 31 and 32 may be fixedly fitted into the groove 111, which is formed in at least a portion of the upper end of the upper base 11. The intermediate base 12 may be coupled to the lower side of the upper base 11, and the lower base 13 may be coupled to the lower side of the intermediate base 12. By way of example, the upper base 11, the intermediate base 12 and the lower base 13 may be coupled to one another by screws, as illustrated in FIG. 11.

The intermediate base 12 may be provided with a plurality of intake holes 121, through which the air introduced into the body 30 by the fan 61 passes.

The detection device may detect the position and size of an object to be dried, such as an infant or a companion animal positioned near the stand. In the stand according to an embodiment of the present disclosure, the detection device may be mounted on the base 10. The detection device may include a sensor housing and a sensor 70.

As illustrated in FIGS. 11 to 13, the sensor housing may be provided in the lateral surface of the intermediate base 12. The sensor housing may be integrally formed in a portion of the lateral surface of the intermediate base 12. The sensor housing may be open at the front face thereof for forward detection of the sensor 70 to be described later.

The sensor 70 may include various kinds of sensors capable of detecting the position and size of an object to be dried. In other words, the sensor 70 may measure the distance to an object to be dried and the size of the object using ultrasonic waves, infrared radiation, radar, lidar or the like. By way of example, the sensor 70 may be a pyroelectric infrared sensor (PIR sensor). The PIR sensor perceptively detects a small amount of infrared radiation, which is generated by an object to be dried, using a pyroelectric effect in which, when a ferroelectric body receives infrared radiation, the ferroelectric body absorbs the heat energy and thus causes spontaneous polarization changes, whereby electric charges are induced in proportion to the magnitude of the change.

As illustrated in FIGS. 9 and 10, at least a portion of the sensor 70 may be received in the sensor housing. The sensor 70 may include a number of sensors corresponding to the number of sensor housings provided in the stand. By way of example, three sensor housings 125a, 125b and 125c may be provided in the front surface of the intermediate base 12, and three sensors 70a, 70b and 70c may be respectively received in the sensor housings 125a, 125b and 125c.

The detection range of the sensor 70, within which the sensor 70 can detect the position and size of an object to be dried, may be determined by the shape of the inner surface of the sensor housing. The detection range is a predetermined angular range in a horizontal direction (i.e., angle in the X-Y plane). More specifically, the detection range of the first sensor 70ay may be determined by the shape of the inner surface of the first sensor housing 125a, which receives therein the first sensor 70a. The detection range of the second sensor 70b may be determined by the shape of the inner surface of the second sensor housing 125b, which receives therein the second sensor 70b. The detection range of the third sensor 70c may be determined by the shape of the inner surface of the third sensor housing 125c, which receives therein the third sensor 70c.

As described above, according to the embodiment, the sensor 70 may include a plurality of sensors. The plurality of sensors may be spaced apart from each other by a predetermined interval. The detection ranges of the plurality of sensors may be different from each other. By way of example, the stand according to an embodiment of the present disclosure may detect the position and size of an object to be dried, which is present within an angular range of 180 degrees in a forward direction or in the +X-axis direction, as illustrated in FIG. 13.

To this end, three sensors 70a, 70b and 70c, each of which is adapted to detect an object within an angular range of 60 degrees, may be provided on the front surface of the intermediate base 12.

As illustrated in FIG. 13, it is preferable that there be no obstruction to the detection of an object even when a non-detection area or a blind area is present among the three sensors 70a, 70b and 70c. To this end, there may be a need to reduce the blind area considerably by adjusting the mounting positions of the sensors.

The detection range, within which the position and size of an object to be dried can be detected, the number of sensors, and the detection range of each of the sensors, which have been described above, are given merely for illustrative purposes, and are not limited to the above-described embodiments.

As illustrated in FIG. 14, the stand according to the embodiment of the present may include a controller 90. The controller 90 may be embodied by at least one of application specific integrated circuits (ASICs), digital signal processors (DSPs), digital signal processing devices (DSPDs), programmable logic devices (PLDs), field-programmable gate arrays (FPGAs), processors, controllers, micro-controllers, microprocessors, and electric units for implementing other functions.

The controller 90 may automatically control rotating action in the horizontal direction of the receptacle 20 by adjusting the rotational direction and the rotational angle of the rotation motor 51 based on information about the object to be dried detected by the detection device (for example, information about the position and size of the object to be dried).

The controller 90 may receive information about the pollution degree of ambient air from a pollution degree sensor S provided at the stand, and may control on/off operation of the fan 61 and/or the ultraviolet generator 63 depending on the pollution degree.

As illustrated in FIGS. 8 and 11, the stand according to the embodiment of the present disclosure may apply power to components that require power, such as the rotation motor 51, the fan 61, the infrared generator 63 and the controller 90, via a power cable, which extends through a power supply hole 123 formed in a portion of the base 10.

The battery B of the dryer 1, which is mounted on the receptacle 20, may be charged by the application of external power, applied via the power cable, to the electrode terminal that extends through a terminal hole 221 in the stand and to the electrode terminal E of the dryer 1.

As illustrated in FIG. 14, the stand according to the embodiment of the present disclosure may include an output unit D.

The output unit D is a component for displaying the operating state of the function of the dryer or the stand to a user. Although not illustrated in the drawings, the output unit D may be embodied as a display provided on a portion of the body 30. The output unit D may display information such as the remaining charge amount of the battery B provided in the dryer 1, information about whether or not hot air or warm air is discharged from the outlet of the dryer 1, the horizontal inclination or rotational angle of the receptacle 20, the pollution degree of ambient air and on/off operation of the air purification unit.

Figure 15:
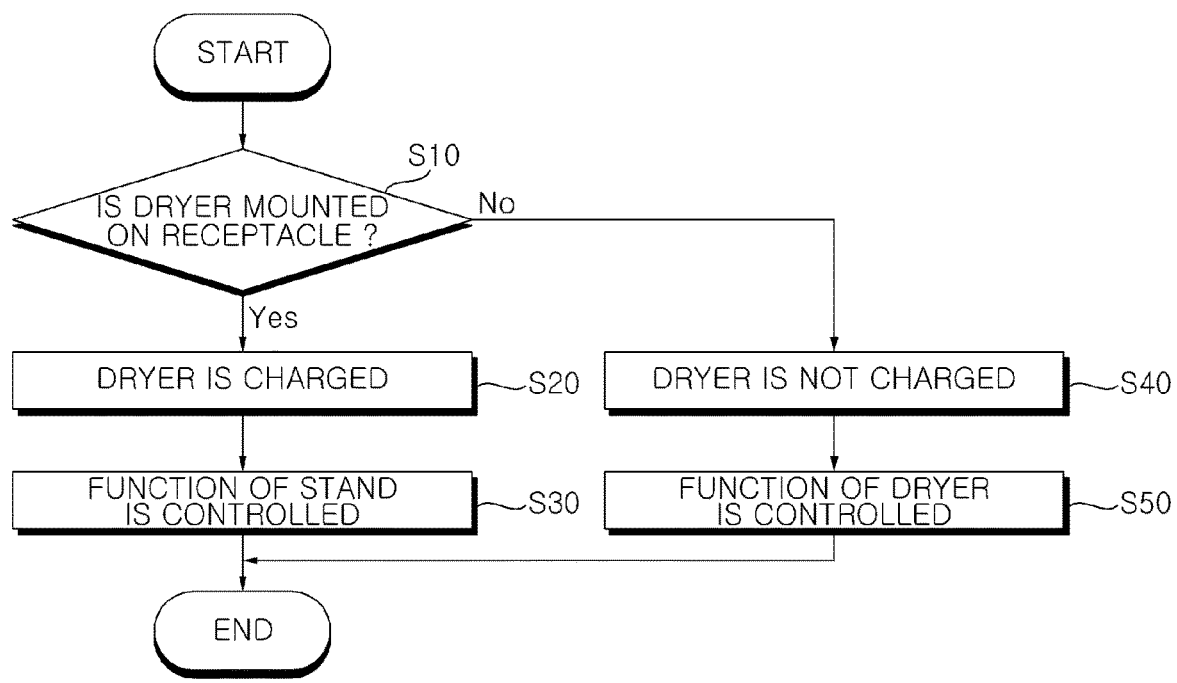
FIGS. 15 to 17 are flowcharts of the method of controlling the dryer and the dryer stand according to the embodiment of the present disclosure.
Figure 16:
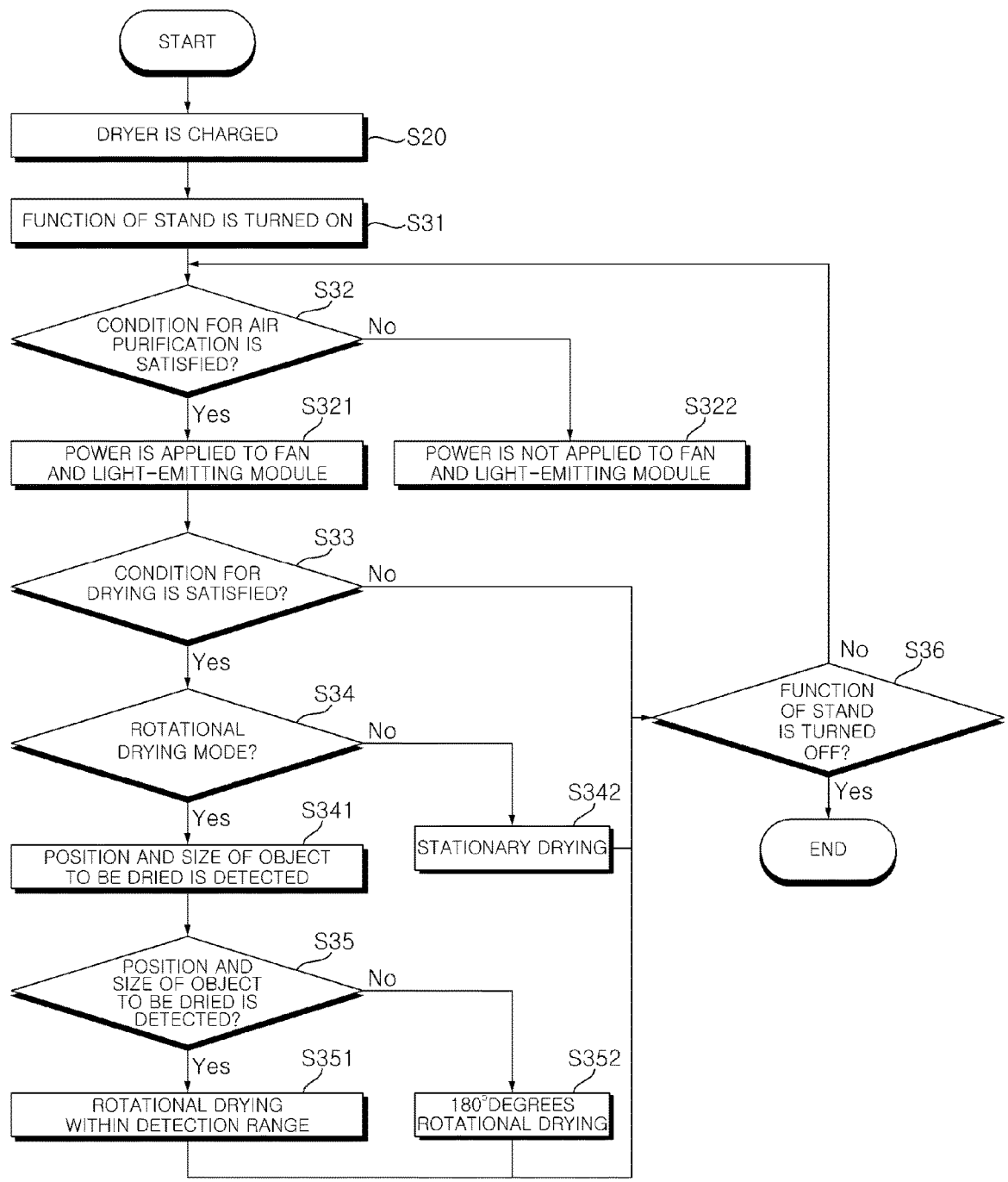
Figure 17:
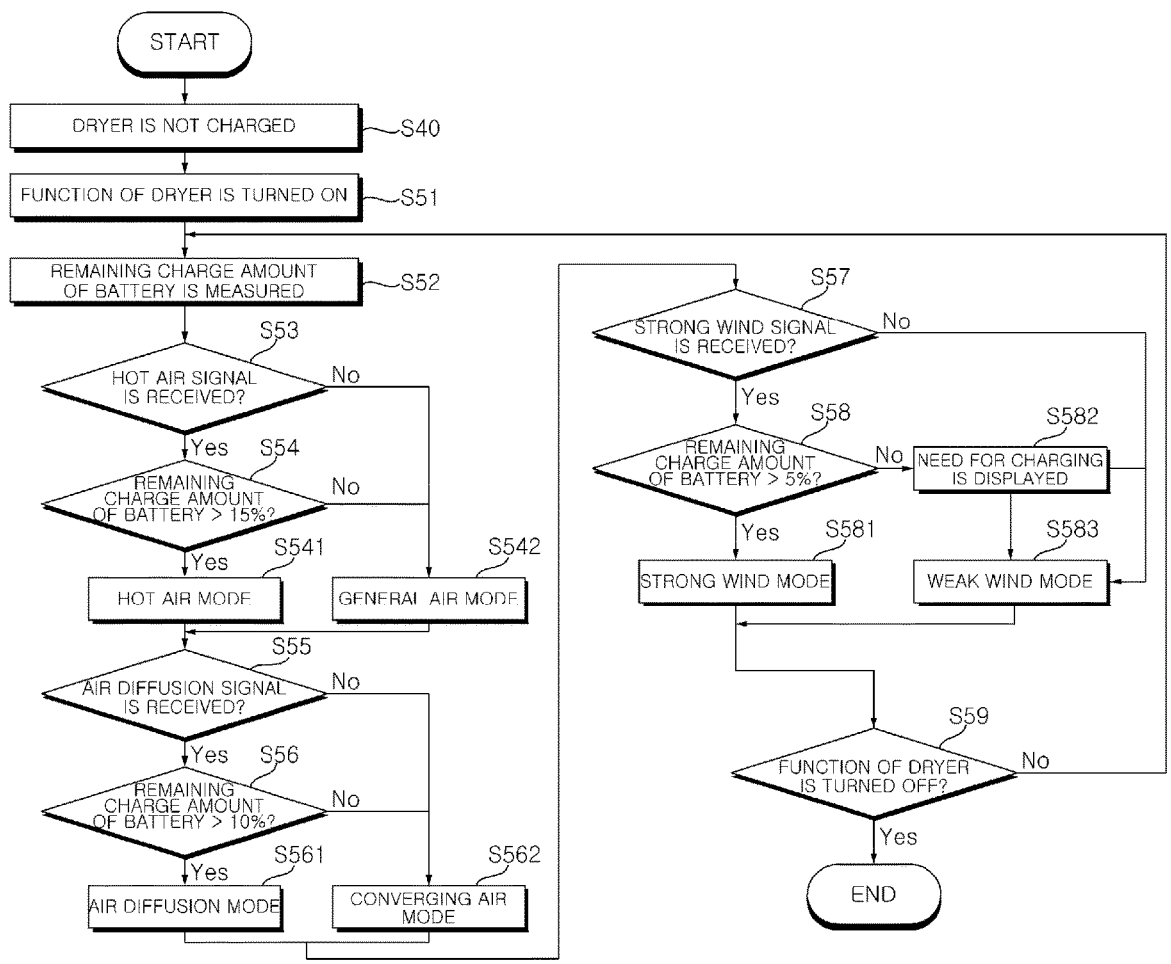

Hereinafter, a method of controlling the dryer and the stand according to the embodiment of the present disclosure will be described with reference to FIGS. 15 to 17 based on the above description of the construction of the dryer and the stand. FIGS. 15 to 17 are flowcharts of the method of controlling the dryer and the dryer stand according to the embodiment of the present disclosure.

The individual operations of the method for controlling the dryer and the stand according to the embodiment of the present may be performed by the controller mounted on the PCB of the dryer 1 and/or the controller 90 of the stand.

The present disclosure is directed to a method of controlling the receptacle 20, on which the dryer 1 for discharging drying air is mounted and which is rotatable in a horizontal direction, and the dryer stand including the air purification unit.

As illustrated in FIG. 15, whether the dryer 1 is mounted on the receptacle 20 (S10) may be determined. When it is determined that the dryer 1 is mounted on the receptacle 20 in operation (S10), operation (S20) of charging the battery B provided in the dryer 1 and operation (S30) of controlling the above-mentioned function of the stand may be performed.

When it is determined that the dryer 1 is not mounted on the receptacle 20, operation (S40) in which the battery B provided in the dryer 1 is not charged and operation (S50) of controlling the above-mentioned function of the dryer 1 may be performed.

Operation (S30) will first be described in detail with reference to FIG. 16. After operation (S20), operation (S31) of turning on the function of the stand may be performed. Here, the phrase "turning on the function of the stand" may be understood to mean a standby state in which the concerned function can be activated or deactivated depending on whether input by a user or a predetermined condition is satisfied.

After operation (S31), it may be determined whether a predetermined condition for air purification operation is satisfied (S32). Operation (S32) may include an operation of measuring the quality of ambient air around the stand and an operation of determining that the predetermined condition for air purification operation is satisfied when the measured quality of ambient air is lower than a predetermined value. Here, the quality of ambient air may be measured by receiving information about the pollution degree of the ambient air from the pollution degree sensor S.

In some embodiments, it may also be determined whether the predetermined condition for air purification operation is satisfied depending on a user's input for air purification operation through one of a plurality of buttons 82a, 82b and 82c provided on the stand.

When it is determined that the predetermined condition for air purification is satisfied in operation (S32), power may be applied to the fan 61 and/or the ultraviolet generator 63, serving as a light-emitting module (S321). Consequently, because air is caused to pass through the HEPA filter 62, the ultraviolet generator 63, the photocatalytic filter 64 and the carbon filter 65, ambient air around the stand may be purified.

When it is determined that the predetermined condition for air purification is not satisfied in operation (S32), power may not be applied to the fan 61 and the ultraviolet generator 63 as a light-emitting module (S322). In other words, since the air purification unit is not operated when there is no need for air purification, it is possible to prevent unnecessary consumption of power.

After operation (S321) or operation (S322), it may be determined whether a predetermined condition for drying is satisfied (S33). Operation (S33) may include an operation of measuring ambient humidity around the stand and an operation of determining whether the predetermined condition for the drying operation is satisfied based on the measured humidity as one piece of information. Here, the humidity may be measured by a humidity sensor provided in the stand.

In some embodiments, it may also be determined whether the predetermined condition for the drying operation is satisfied depending on user input for the drying operation made through one of a plurality of buttons 82a, 82b and 82c provided on the stand.

When it is determined that the predetermined condition for the drying operation is satisfied in operation (S33), the dryer 1 may be operated so as to discharge drying air (hereinafter, referred to as "drying operation"). To this end, the fan F and the heating coil of the dryer 1 may be operated. The drying operation may include operation (S34) of receiving a signal dictating to proceed to a rotational drying operation mode in which the receptacle 20 is rotated in a horizontal direction during the drying operation (hereinafter, referred to as a "rotation signal").

Here, the rotation signal may be input through one of the plurality of buttons 82a, 82b and 82c provided on the stand by a user.

When the rotation signal is not received in operation (S34), the receptacle 20 may be maintained in a predetermined position during the drying operation (S342).

When the rotation signal is received in operation (S34), the position and size of the object to be dried may be detected (S341). The detection of the position and size of the object to be dried in operation (S341) may be performed by the detection device as described above.

After operation (S341), it may be determined whether the position and size of the object to be dried are detected (S35). When it is determined that the position and size of the object to be dried are detected in operation (S35), the receptacle 20 may be repeatedly rotated in a horizontal direction within a range corresponding to the detection range in which the position and size of the object to be dried are detected (S351).

The operation of repeatedly rotating the receptacle 20 in a horizontal direction within a range corresponding to the detection range of at least one sensor among the plurality of sensors, in which the position and size of the object to be dried are detected by controlling forward and reverse rotation of the rotation motor 51, will be described with reference to FIG. 13.

When the position and size of the object to be dried are detected in a first detection range a1 of the first sensor 70a, the controller 90 may control the rotation motor 51 to repeatedly rotate the receptacle 20 within a range corresponding to the first detection range a1 (i.e., a range identical to the first detection range a1).

When the position and size of the object to be dried are detected in a second detection range a2 of the second sensor 70b, the controller 90 may control the rotation motor 51 to repeatedly rotate the receptacle 20 within a range corresponding to the second detection range a2 (i.e., a range identical to the second detection range a2).

When the position and size of the object to be dried are detected in a third detection range a3 of the third sensor 70c, the controller 90 may control the rotation motor 51 to repeatedly rotate the receptacle 20 within a range corresponding to the third detection range a3 (i.e., a range identical to the third detection range a3).

When the position and size of the object to be dried are detected both in the first detection range a1 of the first sensor 70 and in the second detection range a2 of the second sensor 70b, the controller 90 may control the rotation motor 51 to repeatedly rotate the receptacle 20 in a horizontal direction within a range corresponding to the first and second detection ranges a1 and a2 (i.e., a detection range a4, which is the sum of the first detection range a1 and the second detection range a2).

When the position and size of the object to be dried are detected both in the first detection range a1 of the first sensor 70 and in the third detection range a3 of the third sensor 70c, the controller 90 may control the rotation motor 51 to repeatedly rotate the receptacle 20 in a horizontal direction within a range corresponding to the first and third detection ranges a1 and a2 (i.e., a detection range a5, which is the sum of the first detection range a1 and the third detection range a3).

When the position and size of the object to be dried are detected in all of the first detection range a1 of the first sensor 70, the second detection range a2 of the second sensor 70b and the third detection range a3 of the third sensor 70c, the controller 90 may control the rotation motor 51 to repeatedly rotate the receptacle 20 in a horizontal direction within a range corresponding to the first, second and third detection ranges a1, a2 and a3 (i.e., a detection range a6, which is the sum of the first detection range a1, the second detection range a2 and the third detection range a3).

The advantages obtained by controlling the rotational range (radius) of the receptacle 20 by the controller 90 as described above, are as follows.

First, since the detection range in which an object to be dried can be detected is divided into a plurality of detection ranges by the plurality of sensors, it is possible to improve detection accuracy for the position and size of the object to be dried.

Second, since drying air may be discharged at time intervals over the entire detection range in which the object to be dried is detected, it is possible to efficiently dry even an infant or a companion animal, despite frequent changes of position.

When it is determined that the position and size of the object to be dried are not detected in operation (S35), the receptacle 20 may be repeatedly rotated in a horizontal direction within a range corresponding to the predetermined maximum detection range (S352).

By way of example, the predetermined maximum detection range may be an angle of 180 degrees, as illustrated in FIG. 13. In other words, the receptacle 20 may be repeatedly rotated in a horizontal direction within a frontal angular range of 180 degrees in operation (S352). Accordingly, even when it is impossible to detect an object to be dried due to a malfunction or operational error of the detection device although the predetermined condition for the drying operation is satisfied, it is possible to discharge drying air over the entire maximum detection range and thus to efficiently perform an operation of drying an object to be dried.

When the predetermined condition for the drying operation is not satisfied after operation (S351) and operation (S352) or at operation (S33), it may be determined whether the function of the stand is turned off (S36). Here, the phrase "turning off the function of the stand" may be understood to mean a resting state in which the function is maintained in the deactivated state regardless of whether a user's input or the predetermined condition is satisfied.

When it is determined that the function of the stand is turned off in operation (S36), the method of controlling the stand may be terminated. When it is determined that the function of the stand is not turned off, the process may return to operation (S32).

Next, operation (S50) will be described concretely with reference to FIG. 17. Although operation (S50) is described as being performed after it is determined that the dryer 1 is not mounted on the receptacle 20, operation (S50) of the method of controlling the dryer may also be applied while the dryer 1 is mounted on the receptacle 20.

After operation (S40), the function of the dryer 1 may be turned on (S51). Here, the phrase "the function of the dryer 1 is turned on" may be understood to mean a standby state in which the function can be activated or deactivated depending on whether user input is received or a predetermined condition is satisfied.

After operation (S51), the remaining charge amount of the battery B may be measured (S52).

After operation (S52), a signal dictating to proceed to a hot air mode (hereinafter, referred to as a "hot air signal") may be received (S53).

When the hot air signal is received in operation (S53), it may be determined whether the measured remaining charge amount of the battery B is higher than a first reference value (S54). By way of example, although the first reference value may be an amount of 15% of the total capacity of the battery B, the first reference value is not limited thereto.

When it is determined that the remaining charge amount of the battery B, which has been measured in operation (S54), is higher than the first reference value, a hot air mode, in which the dryer 1 is operated so as to discharge the drying air heated by the heating coil H, may be performed (S541). When it is determined that the remaining charge amount of the battery B, which has been measured in operation (S54), is lower than the first reference value, a general air mode, in which the dryer 1 is operated so as to discharge drying air, which is not heated by the heating coil H, may be performed (S542). Operation (S542) may also be performed when the hot air signal is not received in operation (S53).

After operation (S541) or (S542), a signal dictating to proceed to an air diffusion mode (hereinafter, referred to as an "air diffusion signal") may be received (S55).

Here, the term "diffusing air" may mean that the discharge unit, rotated by the motor 3a, diffusely discharges the drying air passing through the discharge tube 4a toward a region to be dried. Meanwhile, the term "converging air" may mean that the drying air passing through the discharge tube 4a is intensively discharged toward a region to be dried because the discharge unit is stationary. The diffusing air may be advantageous in slowly drying a wide region, and the converging air may be advantageous in quickly drying a narrow region.

When the air diffusion signal is received, it may be determined whether the measured remaining charge amount of the battery B is higher than a second reference value (S56). By way of example, although the second reference value may be an amount of 10% of the total capacity of the battery B, the second reference value is not limited thereto.

When it is determined that the measured remaining charge amount of the battery B is higher than the second reference value in operation (S56), the air diffusion mode, in which the dryer 1 is operated so as to discharge drying air through the outlet of the discharge tube 4a, may be performed (S561). When it is determined that the measured remaining charge amount of the battery B is equal to or lower than the second reference value in operation (S56), a converging air mode, in which the dryer 1 is operated so as to discharge drying air through the outlet of the stationary discharge tube 4a, may be performed (S562). Operation (S562) may also be performed when the air diffusion signal is not received in operation (S55).

After operation (S561) or (S562), a signal dictating to proceed to a strong wind mode (hereinafter, referred to as a "strong wind signal") may be received (S57).

Here, the term "strong wind" means that the flow rate of drying air discharged through the outlet of the dryer 1 is equal to or higher than a predetermined value due to high-speed rotation of the fan F. Meanwhile, the term "weak wind" means that the flow rate of drying air discharged through the outlet of the dryer 1, is lower than the predetermined value due to low-speed rotation of the fan F. In some embodiments, the operation of controlling the flow rate of drying air may further be divided into different levels between the levels of strong wind and weak wind.

When the strong wind signal is received in operation (S57), it may be determined whether the measured remaining charge amount of the battery B is higher than a third reference value (S58). By way of example, although the third reference value may be an amount of 5% of the total capacity of the battery B, the third reference value is not limited thereto.

When it is determined that the measured remaining charge amount of the battery B is higher than the third reference value in operation (S58), the strong wind mode, in which the dryer 1 may be operated so as discharge drying air of a predetermined flow rate or higher by high-speed rotation of the fan F, may be performed (S581). When it is determined that the measured remaining charge amount of the battery B is equal to or lower than the third reference value in operation (S58), a weak wind mode, in which the dryer 1 is operated so as to discharge drying air at a flow rate lower than the predetermined level, may be performed (S583).

According to the embodiment, a user may be notified of the fact that there is a need to charge the battery B (i.e., recommend that the dryer 1 must be mounted on the stand and must then be charged) before operation (S583). In operation (S582), messages of the remaining charge amount of the battery B and the necessity to charge the battery B may be visually provided to a user through the display unit.

Operation (S583) may also be performed even when the strong wind signal is not received in operation (S57).

The present disclosure, which is constructed as described above, offers an advantage in that it is possible to efficiently manage the battery B such that the main function of the dryer, that of performing an operation of drying by discharging air to an object to be dried, is preserved for as long a period of time as possible.

After operation (S581) or (S583), it may be determined whether the function of the dryer is turned off (S59).

Here, the phrase "the function of the dryer is turned off" may be understood as a resting state in which the concerned function is maintained in the deactivated state regardless of whether the user's input or a predetermined condition is satisfied.

When it is determined that the function of the dryer is turned off in operation (S59), the process of controlling the dryer may be terminated. Meanwhile, when it is determined that the function of the dryer is not turned off in operation (S59), the process may return to operation (S52).

According to the present disclosure, one or more of the following effects may be achieved.

First, it may be possible to purify indoor air by controlling the air purification unit to operate when the condition for air purification operation is satisfied.

Second, it may be possible to perform a drying operation on an object to be dried by controlling the dryer, which is mounted on the stand, to operate when the predetermined condition for the drying operation is satisfied.

Third, it may be possible to easily perform a drying operation on an object to be dried (particularly, an object in which the position of the object is frequently changing) by controlling the receptacle, on which the dryer is mounted, to be repeatedly rotated in a horizontal direction within a detection range within which the position and size of the object are detected.

Fourth, it may be possible to efficiently manage the battery such that a main function of the dryer of performing an operation of drying by discharging air to an object to be dried is preserved for as long period of time as possible. To this end, as the remaining charge amount of the battery provided in the dryer becomes lower than a predetermined reference value, the function of heating drying air, the function of diffusely discharging drying air and the function of controlling the flow rate of drying air may be sequentially deactivated.

The method of controlling the dryer and the dryer stand according to the embodiments of the present disclosure have been described with reference to the accompanying drawings. However, those skilled in the art will appreciate that the present disclosure is not limited to the above embodiments and the various modifications, additions and substitutions are possible, without departing from the scope and spirit of the disclosure as disclosed in the accompanying claims.

What is claimed is:

1. A method of controlling a dryer stand, the dryer stand including a rotatable receptacle, the receptacle configured to mount a portion of a dryer therein, the dryer stand further including an air purifier, the method comprising:
   detecting, by a controller of the dryer stand, when the portion of the dryer is mounted in the receptacle;
   charging a battery provided in the dryer when the portion of the dryer is detected as being mounted in the receptacle;
   determining, by the controller of the dryer stand, whether a predetermined condition for an air purification operation is satisfied; and
   operating the air purifier when it is determined that the predetermined condition for the air purification operation is satisfied.

2. The method according to claim 1, wherein determining whether the predetermined condition for the air purification operation is satisfied comprises:
   measuring a quality of ambient air around the dryer stand; and
   determining that the predetermined condition for the air purification operation is satisfied when the measured quality of the ambient air is equal to or lower than a predetermined value.

3. The method according to claim 1, further comprising determining, by the controller of the dryer stand, whether a predetermined condition for a drying operation is satisfied; and
   operating the dryer to discharge drying air to perform the drying operation when the controller of the dryer stand determines that the predetermined condition for the drying operation is satisfied.

4. The method according to claim 3, wherein determining whether the predetermined condition for the drying operation is satisfied comprises:
   measuring an ambient humidity around the dryer stand; and
   determining that the predetermined condition for the drying operation is satisfied when the measured humidity is equal to or greater than a predetermined value.

5. The method according to claim 3, wherein operating the dryer comprises:
   receiving a rotation signal to perform a rotational drying operation mode in which the receptacle is rotated in the horizontal direction during the drying operation;
   detecting a position and a size of an object to be dried when the rotation signal is received; and
   when the position and the size of the object to be dried are detected within a predetermined detection range, repeatedly rotating the receptacle in the horizontal direction within a range corresponding to the predetermined detection range.

6. The method according to claim 5, wherein, when the position and the size of the object to be dried are not detected, operating the dryer comprises repeatedly rotating the receptacle in the horizontal direction within a range corresponding to a predetermined maximum detection range.

7. The method according to claim 5, wherein, when the rotation signal is not received, operating the dryer comprises maintaining the receptacle in a stationary position during the drying operation.

8. The method according to claim 1, wherein operating the air purifier comprises operating a fan to induce a flow of air to the air purifier.

9. The method according to claim 8, wherein operating the air purifier comprises operating a light emitter to treat the flow of air.

* * * * *